US012603803B2

(12) United States Patent
Thompson et al.

(10) Patent No.: US 12,603,803 B2
(45) Date of Patent: Apr. 14, 2026

(54) METHODS AND DEVICES FOR FREQUENCY MODULATION REDUCTION FOR POLAR TRANSMITTERS

(71) Applicant: Morse Micro Pty. Ltd., Surry Hills (AU)

(72) Inventors: Ryan Thompson, Surry Hills (AU); Yingbo Zhu, Surry Hills (AU); Justin Penfold, Surry Hills (AU); Andrew Terry, Surry Hills (AU)

(73) Assignee: Morse Micro Pty. Ltd., Surry Hills (AU)

( * ) Notice: Subject to any disclaimer, the term of this patent is extended or adjusted under 35 U.S.C. 154(b) by 14 days.

(21) Appl. No.: 18/919,297

(22) Filed: Oct. 17, 2024

(65) Prior Publication Data

US 2025/0141727 A1 May 1, 2025

(30) Foreign Application Priority Data

Oct. 25, 2023 (AU) ................................ 2023903405

(51) Int. Cl.
*H04L 27/00* (2006.01)
*H04L 27/26* (2006.01)

(52) U.S. Cl.
CPC ...... *H04L 27/2626* (2013.01); *H04L 27/0014* (2013.01); *H04L 2027/0016* (2013.01)

(58) Field of Classification Search
CPC .... H03C 5/00; H03C 2200/0058; H04B 1/02; H04B 1/04; H04B 5/00; H04L 1/24;
H04L 25/02; H04L 25/49; H04L 27/00;
H04L 27/20; H04L 27/26; H04L 27/36;
H04L 27/0014; H04L 27/2626; H04W 56/00
USPC ................ 375/219, 295–297, 300, 302, 345;
455/23, 41.1, 76, 91, 102, 108, 110, 113, 455/126
See application file for complete search history.

(56) References Cited

U.S. PATENT DOCUMENTS

| | | | | |
|---|---|---|---|---|
| 7,693,496 B2 * | 4/2010 | Lewis | ...................... | H03C 5/00 455/108 |
| 8,112,047 B2 * | 2/2012 | Georgantas | .......... | H04B 1/0483 375/302 |
| 2010/0120381 A1 * | 5/2010 | Chiu | ........................ | H03C 5/00 455/113 |

* cited by examiner

*Primary Examiner* — Shawkat M Ali
(74) *Attorney, Agent, or Firm* — Polsinelli PC

(57) ABSTRACT

Systems and techniques are provided for a polar transmitter using a reduced frequency modulation (FM) range. Baseband complex data can be converted into magnitude and phase components by a cartesian-to-polar conversion module. For each respective phase of the phase component, a phase selection can be determined from a plurality of phase selection candidates and used to generate a phase select parameter and a modified phase for the respective phase. A set of clock signals includes a clock signal with a frequency controlled by the modified phase, and one or more shifted clock signals with phase shifts relative to the clock signal. An input clock signal can be selected from the set using the phase select parameter. A power amplifier can be driven by the magnitude component according to the input clock signal to generate a RF signal for transmission by the polar transmitter on a wireless medium.

20 Claims, 14 Drawing Sheets

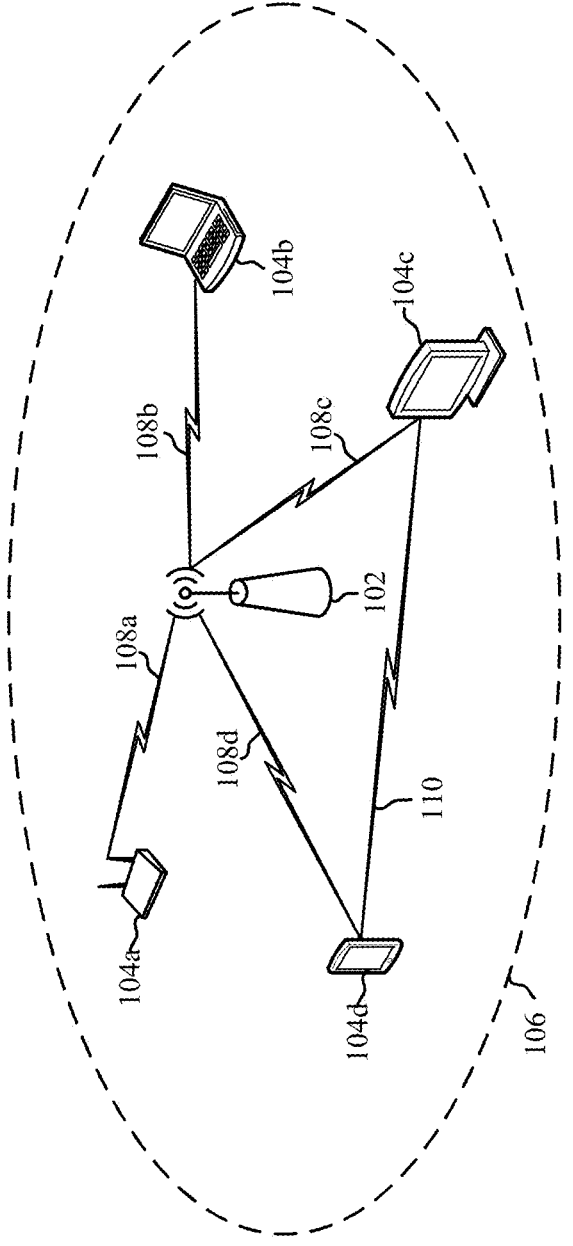
FIG. 1

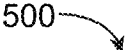
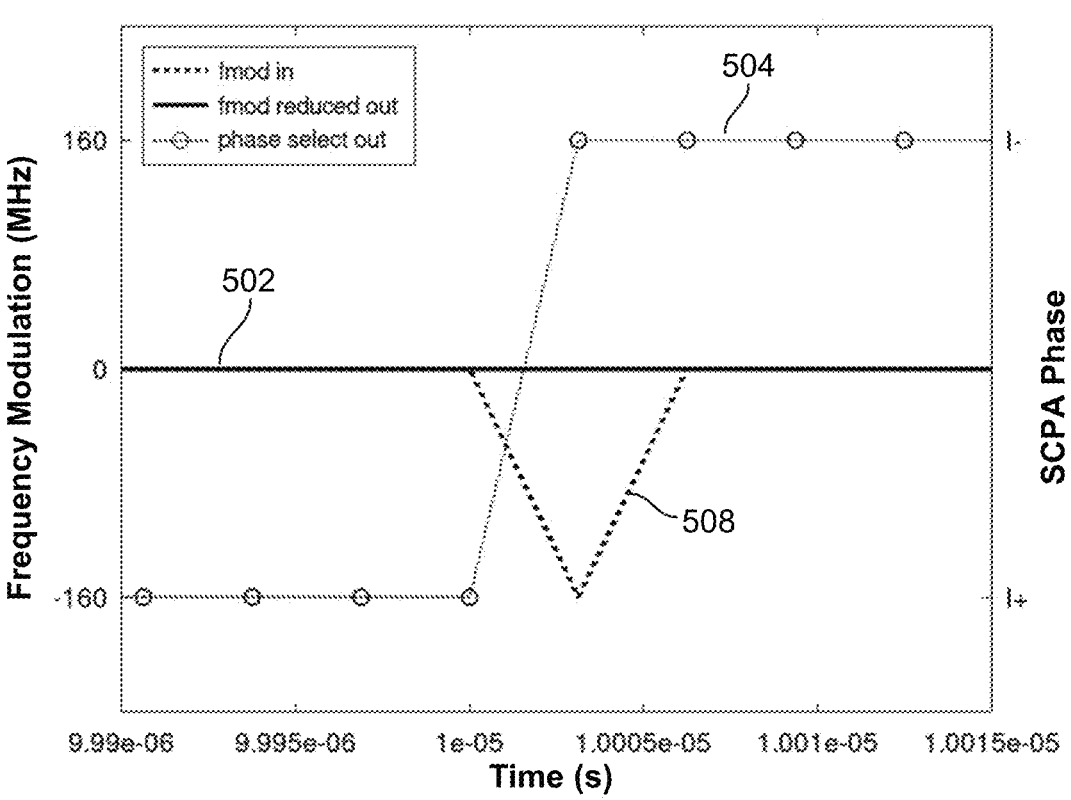
FIG. 5

1000 —

FM paths of polar transmitter with and without FM reduction

1100 —

SEM (RF) for 4MHz 802.11ah no data packet

1200
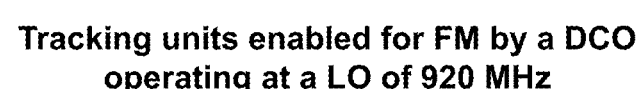
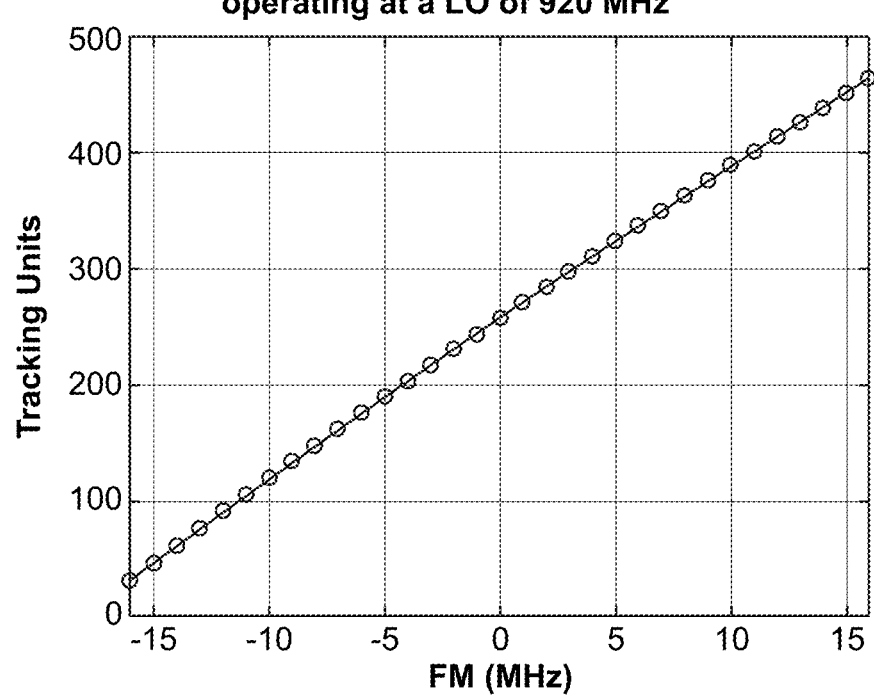
FIG. 12
1300
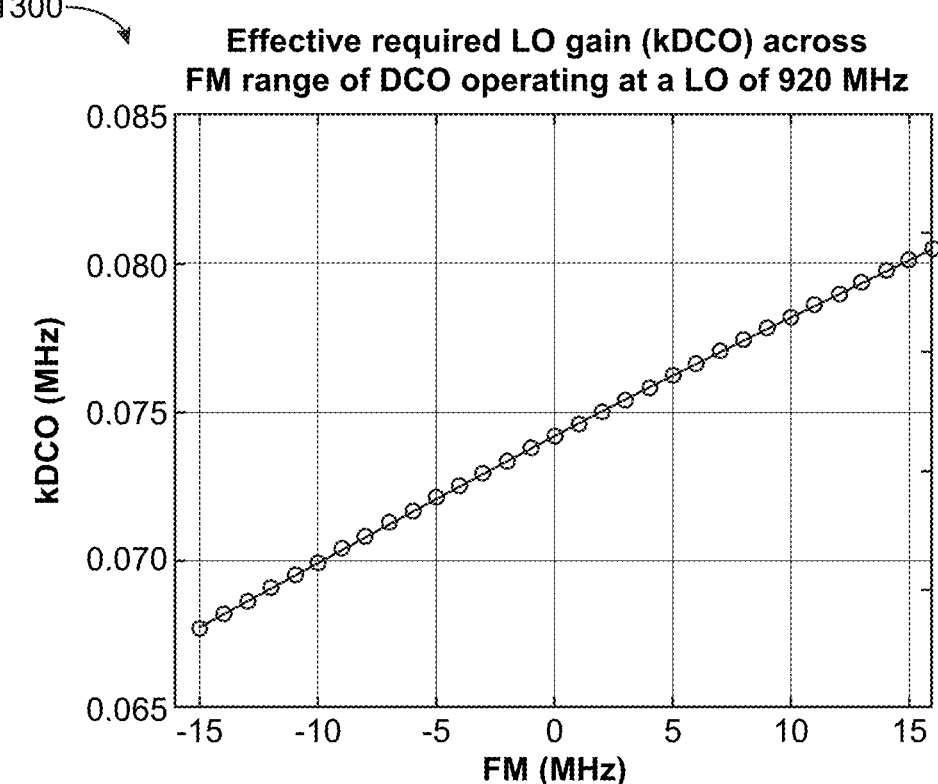
FIG. 13

Measured kDCO values for FM between a previous and an updated frequency

Plane fit for LO gain gradient correction

1600

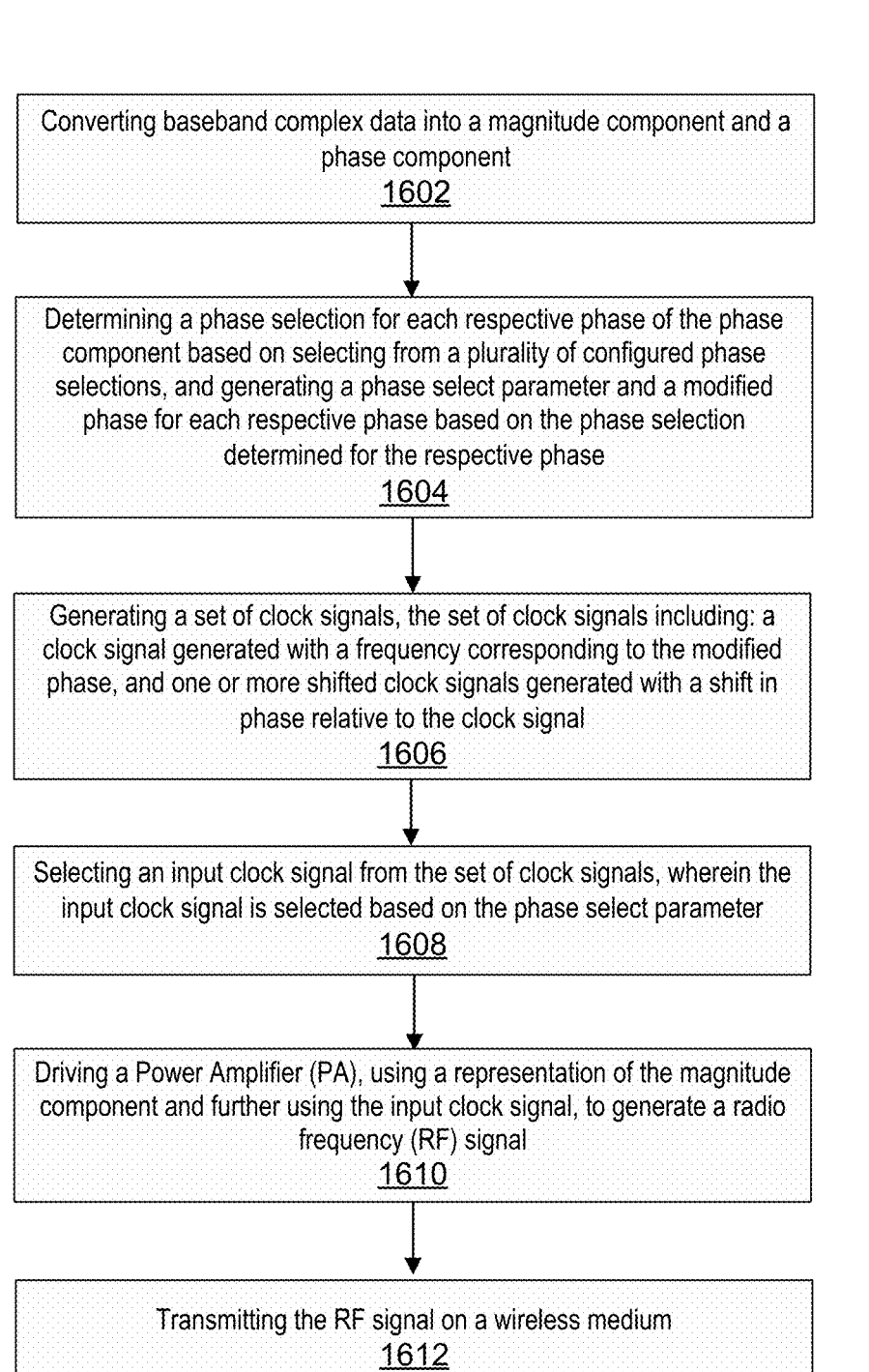

Converting baseband complex data into a magnitude component and a phase component
1602

Determining a phase selection for each respective phase of the phase component based on selecting from a plurality of configured phase selections, and generating a phase select parameter and a modified phase for each respective phase based on the phase selection determined for the respective phase
1604

Generating a set of clock signals, the set of clock signals including: a clock signal generated with a frequency corresponding to the modified phase, and one or more shifted clock signals generated with a shift in phase relative to the clock signal
1606

Selecting an input clock signal from the set of clock signals, wherein the input clock signal is selected based on the phase select parameter
1608

Driving a Power Amplifier (PA), using a representation of the magnitude component and further using the input clock signal, to generate a radio frequency (RF) signal
1610

Transmitting the RF signal on a wireless medium
1612

METHODS AND DEVICES FOR FREQUENCY MODULATION REDUCTION FOR POLAR TRANSMITTERS

CROSS-REFERENCE TO RELATED APPLICATIONS

This application claims the benefit of Australian Provisional Patent Application No. 2023903405, filed Oct. 25, 2023, which is hereby incorporated by reference, in its entirety and for all purposes.

FIELD

The present disclosure generally relates to wireless communications. For example, aspects of the present disclosure are related to polar transmitters, and more particularly, to systems and techniques for reducing a frequency modulation (FM) range of a polar transmitter.

BACKGROUND

Power Amplifiers (PAs) are used in Radio Frequency (RF) transmitters for transmission of electromagnetic energy. Power amplifier efficiency highly influences power consumption in wireless transceivers. For example, the efficiency of an RF PA in a transmitter can be important in any radio system, as the PA is responsible for a significant part of the power consumed by the radio system. In some examples, the efficiency of an RF PA can correspond to the efficiency of the power conversion performed (e.g., by the RF PA) from a Direct Current (DC) supply input to an RF power output.

Existing transmitters for modern modulation schemes often utilize a direct conversion architecture, which implements separate channels for In-phase (I) and Quadrature-phase (Q) paths of a baseband signal (e.g., I components are separated from the baseband signal and provided to and processed on the I path, while Q components are separated from the baseband signal and provided to and processed on the Q path). In the direct conversion architecture, the separate channels provided by the I and Q paths of the baseband signal are then mixed to a desired carrier frequency with a Local Oscillator (LO) to generate an RF signal. The RF signal is then amplified by a PA for transmission. The use of I and Q channels introduces in-phase and quadrature-phase (IQ) imbalance that is suffered by traditional direct-conversion cartesian transmitters. For example, based on Process Voltage Temperature (PVT) variations and differences in circuit routing, the Q channel may not be at an exact 90° offset to the I channel, causing an IQ imbalance. In a cartesian transmitter, this IQ imbalance introduces a cross-carrier interference and thus reduces Error Vector Magnitude (EVM) performance of the transmitter. An alternative to direct conversion and/or cartesian transmitters may be provided by the use of a polar transmitter. For example, polar transmitters convert I and Q signals into magnitude and phase components, respectively. Polar transmitters can achieve an efficiency gain by modulating the magnitude component of the baseband signal by the PA, and modulating the phase component of the baseband signal by the LO.

BRIEF SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for polar transmission using a polar transmitter with a reduced frequency modulation (FM) range. According to at least one illustrative example, a polar transmitter transmitting a Radio Frequency (RF) signal in a wireless communication network is provided, the polar transmitter comprising: a cartesian to polar conversion module configured to generate a magnitude component and a phase component from baseband complex data received as input; a frequency modulation (FM) reduction module configured to determine a phase selection for each respective phase of the phase component based on selecting from a plurality of configured phase selections, wherein the FM reduction module is further configured to generate a phase select parameter and a modified phase for each respective phase based on the phase selection; a local oscillator (LO) configured to receive the modified phase from the FM reduction module and generate a clock signal with a frequency corresponding to the modified phase; a quadrature generator configured to receive the clock signal from the LO and generate a set of clock signals, the set of clock signals including the clock signal and one or more shifted clock signals with a shift in phase relative to the clock signal received from the LO; a phase select multiplexer, configured to select an input clock signal from the set of clock signals, wherein the input clock signal is selected based on the phase select parameter; and a Power Amplifier (PA), coupled to the phase select multiplexer and configured to generate an RF signal from a representation of the magnitude component as processed on an amplitude modulation (AM) path of the polar transmitter, and further using the input clock signal from the phase select multiplexer.

In some aspects, the plurality of configured phase selections includes four possible phase selections, the four possible phase selections comprising: a positive in-phase (I+) phase selection, a negative in-phase (I–) phase selection, a positive quadrature-phase (Q+) phase selection, and a negative quadrature-phase (Q–) phase selection.

In some aspects, the FM reduction module generates the phase select parameter and a sign select parameter for each respective phase, the phase select parameter and the sign select parameter corresponding to the phase selection determined for each respective phase, and wherein the sign select parameter is output to the PA.

In some aspects, the quadrature generator is configured to generate one shifted clock signal with a 90 degree shift in phase relative to a phase of the clock signal received from the LO; the phase select multiplexer selects the input clock signal from a set of two clock signals comprising the shifted clock signal and the clock signal received from the LO, the selection performed according to the phase select parameter; and the PA adaptively inverts the input clock signal based on a value of the sign select parameter.

In some aspects, the phase select parameter solely indicates the phase selection; the quadrature generator is configured to generate three shifted clock signals based on the clock signal received from the LO, wherein the three shifted clock signals are generated with 90 degree phase shifts from each other; and the phase select multiplexer selects the input clock signal from a set of four clock signals comprising the three shifted clock signals and the clock signal received from the LO, the selection performed according to the phase select parameter.

In some aspects, the FM reduction module is further configured to determine a phase difference between consecutive phases of the phase component from the baseband complex data received as input, and wherein the phase selection for each respective phase is determined based on the corresponding phase difference.

In some aspects, the phase selection is unchanged in response to a determination the corresponding phase difference between consecutive phases is less than a configured threshold.

In some aspects, the PA is a Switched Capacitor Power Amplifier (SCPA).

In some aspects, the cartesian to polar conversion module comprises a Coordinate Rotation Digital Computer (CORDIC).

In some aspects, the RF signal transmitted in the wireless communication network is modulated using Orthogonal Frequency Division Multiplexing (OFDM).

In some aspects, the FM reduction module is further configured to: determine a correction term for an in-phase/quadrature-phase (I/Q) phase imbalance associated with the modified phase; and apply the determined correction term to the modified phase to correct the I/Q phase imbalance.

In another illustrative example, a transmission method for a polar transmitter operating in a wireless communication network is provided. For example, the transmission method can comprise: converting baseband complex data into a magnitude component and a phase component; determining a phase selection for each respective phase of the phase component based on selecting from a plurality of configured phase selections; generating a phase select parameter and a modified phase for each respective phase based on the phase selection determined for the respective phase; generating a clock signal with a frequency corresponding to the modified phase; generating a set of clock signals, the set of clock signals including the clock signal and one or more shifted clock signals with a shift in phase relative to the clock signal; selecting an input clock signal from the set of clock signals, wherein the input clock signal is selected based on the phase select parameter; driving a Power Amplifier (PA), using a representation of the magnitude component and further using the input clock signal, to generate a radio frequency (RF) signal; and transmitting the RF signal on a wireless medium.

In some aspects, wherein the plurality of configured phase selections includes four possible phase selections, the four possible phase selections comprising: a positive in-phase (I+) phase selection, a negative in-phase (I−) phase selection, a positive quadrature-phase (Q+) phase selection, and a negative quadrature-phase (Q−) phase selection.

In some aspects, a frequency modulation (FM) range of the polar transmitter is reduced based on jumping between the four possible phase selections to generate the RF signal.

In another illustrative example, a polar transmitter transmitting a Radio Frequency (RF) signal in a wireless communication network is provided, the polar transmitter comprising: a cartesian to polar conversion module configured to generate a magnitude component and a phase component from baseband complex data received as input; a frequency modulation (FM) reduction module configured to determine a phase selection for each respective phase of the phase component based on selecting from a plurality of configured phase selections, and further configured to generate a phase select parameter, a modified phase, and a sign parameter for each respective phase based on the phase selection for the respective phase; a Phase Lock Loop (PLL) configured to receive the modified phase and generate a clock signal with a frequency based on the modified phase; a quadrature generator configured to receive the clock signal from the PLL and generate a shifted clock signal based on applying a phase shift to the clock signal; an Amplitude Modulation (AM) module configured to generate a signed magnitude component based on the magnitude component from the cartesian to polar conversion module and the sign parameter from the FM reduction module, the sign parameter indicative of a positive or negative sign for the magnitude component; a phase select multiplexer configured to receive the phase select parameter from the FM reduction module and the signed magnitude component from the AM module, wherein the phase select multiplexer generates an I input and a Q input based on the phase select parameter and the signed magnitude component; and a Power Amplifier (PA), coupled to the phase select multiplexer and the quadrature generator, wherein the PA is driven to generate an RF signal using one or more of the I input or Q input according to one or more of the clock signal or the shifted clock signal received from the quadrature generator.

In some aspects, the PA is a Switched Capacitor Power Amplifier (SCPA).

In some aspects, the polar transmitter further comprises a frequency divider configured to divide a frequency of the clock signal from the PLL to thereby generate a divided clock signal before output to the quadrature generator, wherein the PA is driven according to one or more of the divided clock signal or a shifted divided clock signal.

In some aspects, the shifted divided clock signal is generated by the quadrature generator, based on applying the phase shift to the divided clock signal.

In some aspects, the FM reduction module is further configured to: determine a correction term for an in-phase/quadrature-phase (I/Q) phase imbalance associated with the modified phase; and apply the determined correction term to the modified phase to correct the I/Q phase imbalance.

In some aspects, the PLL is configured to correct for linear drift in a Local Oscillator (LO) gain according to a correction term of a LO gain gradient.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following drawing figures:

FIG. 1 is a block diagram illustrating an exemplary wireless communication network;

FIG. 5 is a diagram illustrating an example of frequency modulation (FM) variation associated with SCPA phase selection, in accordance with some examples;

FIG. 12 is a graph illustrating an example of the number of tracking units enabled for FM by a digitally-controlled oscillator (DCO) operating at an LO frequency of 920 MHz, in accordance with some examples;

FIG. 13 is a graph illustrating an example of the effective required LO gain (e.g., kDCO) across the FM range of the DCO associated with the graph of FIG. 12, in accordance with some examples;

FIG. 16 is a flow diagram of an example process for polar transmission with a reduced frequency modulation (FM) range, in accordance with some examples.

DETAILED DESCRIPTION

Figure 2A:
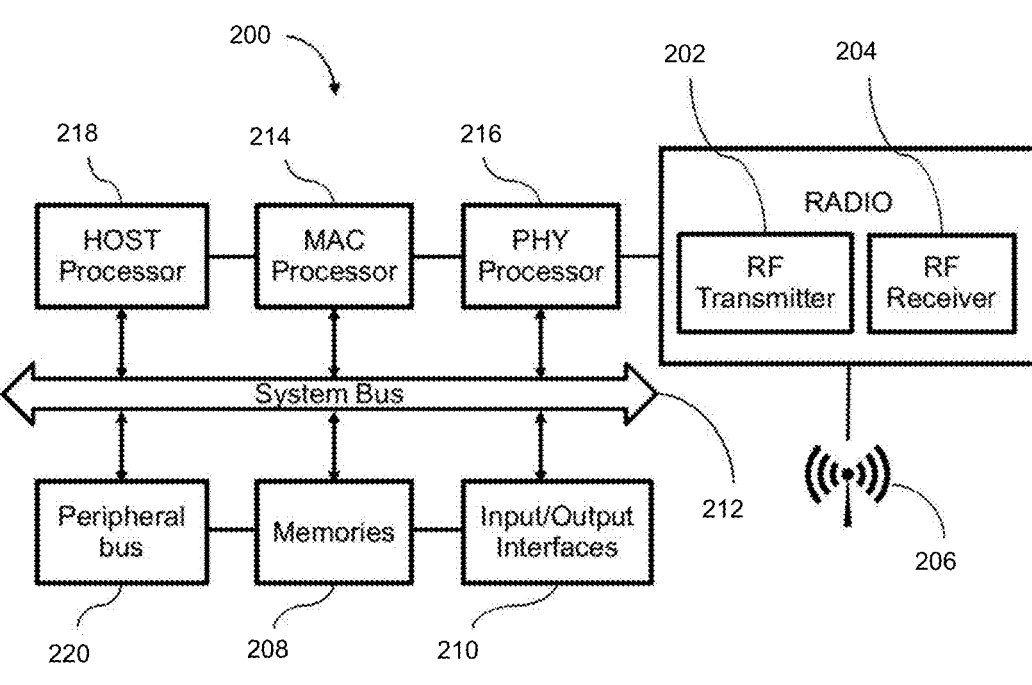
FIG. 2A is a block diagram of a wireless communication device that can implement a station (STA) or access point (AP), in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Overview

Aspects of the present invention present a novel and effective way for a polar transmitter to transmit RF signals with a reduced Local Oscillator (LO) Frequency Modulation (FM) range. Embodiments of a polar transmitter in a wireless communication network are provided, where the polar transmitter includes a cartesian to polar conversion module, a FM reduction module, a LO, a quadrature generator, a phase select multiplexer, and a Power Amplifier (PA). The cartesian to polar conversion module of the polar transmitter receives baseband complex data as input (in cartesian coordinates), and converts the baseband complex data into polar coordinates, with the output from the cartesian to polar conversion module comprising a magnitude component and a phase component. The FM reduction module is coupled to the cartesian to polar conversion module can is configured to receive the phases (e.g., phase information) of the phase component.

The FM reduction module can be used to determine a phase selection (also referred to as phase selection information, a phase select or phase selection parameter, etc.) by selecting from N possible phase selections (e.g., a quantity N of pre-determined or configured phase selection candidates or phase selection options) for each phase of the phase component. Based on the respective phase selection for each phase of the phase component, the FM reduction module can be used to generate a phase select parameter and a modified phase for each phase of the phase component. The quantity N of configured phase selection candidates/possible phase selection options is a positive integer.

The LO can be coupled to the FM reduction module. The modified phase generated by the FM reduction module (e.g., for each phase of the phase component provided to the FM reduction module) can be provided as input to the LO, which can be configured to use the modified phase for modulation. In some embodiments, the LO generates a clock signal with a frequency controlled by the modified phase. The polar transmitter can further include a quadrature generator coupled to the LO for receiving the generated clock signal. Based on the generated clock signal from the LO, the quadrature generator can be used to generate one or more shifted clock signals with a shift in phase of the clock signal received from the LO.

A phase select multiplexer can be coupled to the quadrature generator and the FM reduction module. The phase select multiplexer can be configured to receive the clock signal and the one or more shifted clock signals from the quadrature generator, and can be configured to receive the phase select parameter from the FM reduction module. The phase select multiplexer selects an input clock signal for the PA from the set of received clock signals from the quadrature generator. The selection of the input clock signal for the PA can be performed by the phase select multiplexer according to the phase select parameter previously determined by the FM reduction module. The PA is coupled to the phase select multiplexer and the cartesian to polar conversion module. The magnitude component generated as output by the cartesian to polar conversion module is used to drive the PA according to the input clock signal received from the phase select multiplexer. The PA generates and transmits a RF signal on a wireless medium.

As noted above, the FM reduction module can be configured to perform phase selection and/or determine phase selection information from a quantity N of pre-determined or configured phase selection candidates or phase selection options. In some embodiments, N is a power of two. For example, N can be equal to four, where the four possible phase selections (e.g., configured phase selection candidates, etc.) are positive in-phase (I+), negative in-phase (I−), positive quadrature-phase (Q+), and negative quadrature-phase (Q−). In some aspects, the FM reduction module generates the phase select parameter and a sign select parameter from the phase selection determined (e.g., selected from the N configured phase selection candidates) for each phase included within or otherwise associated with the phase component(s) generated as output by the cartesian to polar conversion module. The phase select parameter is output from the FM reduction module to the phase select multiplexer of the polar transmitter, and the sign select parameter is output from the FM reduction module to the PA of the polar transmitter. In such embodiments, the quadrature generator can be configured to generate one shifted clock signal with a 90° shift from the clock signal received from the LO. Accordingly, the phase select multiplexer selects the input clock signal from the two clock signals (e.g., the original clock signal from the LO, and the 90° shifted clock signal from the quadrature generator) according to or based on the value of the phase shift parameter. Subsequently, after selection of the input clock signal by the phase select multiplexer, the PA adaptively or dynamically inverts the input clock signal according to the sign select parameter. In another embodiment, the phase select parameter indicates the phase selection, and the quadrature generator receives the clock signal from the LO to create three additional shifted clock signals each with 90° shifts apart from each other (e.g., for a total of four shifted clock signals). In such embodiments, the phase select multiplexer is similarly configured to select the input clock signal from the four shifted clock signals received from the quadrature generator according to the phase select parameter.

In some embodiments of the polar transmitter, the FM reduction module can be further configured to compute or otherwise determine a phase difference between consecutive phases of the phase component provided as input to the FM reduction module from the output of the cartesian to polar conversion module. In such embodiments, the FM reduction module can determine the phase selection for each phase based on the corresponding phase difference. For example, the phase selection can be left as unchanged when the corresponding phase difference is less than a threshold, etc.

In some embodiments, the PA is a digital PA (DPA). A DPA can integrate multiple functions and/or functionalities, such as a Digital to Analog Converter (DAC), a frequency up-converter/mixer, and a PA. The use of a DPA in an RF transceiver can improve the energy efficiency and reduce the power consumption of the RF transceiver, and can additionally reduce the chip area associated with the physical implementation of the RF transceiver (e.g., based on the multiple functions integrated into or by the DPA). In-phase (I) and Quadrature-phase (Q) components of an input signal may be separated and coupled to different sections of the DPA. Coding circuits within the DPA are used for mapping the respective amplitudes of the I and Q components to drive these separate sections of the DPA. The signals from each section are then summed (e.g., recombined) to generate the final output of the DPA. A Switched Capacitor Power Amplifier (SCPA) is a type of DPA, which uses capacitors, along with transistors acting as switches, to achieve high linearity and efficiency, especially at higher output power levels. In an SCPA architecture, capacitors in arrays may be selectively driven (or not driven) by an input clock signal, to thereby be turned on or off. This selective activation of capacitors can be controlled by amplitude codes derived from the amplitudes of the I and Q components of the input signal. For example, the amplitudes of the I and Q components can be coded into amplitude codes, and used to control which capacitors in each capacitor array of the SCPA are turned on.

In some embodiments, the PA of a polar transmitter can be implemented as an SCPA. In some aspects, an embodiment of the cartesian to polar conversion module of a polar transmitter can be implemented as and/or can be realized in a Coordinate Rotation Digital Computer (CORDIC). In some embodiments, the RF signal transmitted in the wireless communication network by the polar transmitter is modulated in an Orthogonal Frequency Division Multiplex (OFDM) technique, modulation scheme, etc.

An aspect of the present invention provides a transmission method for a polar transmitter operating in a wireless communication network. The method includes converting baseband complex data into a magnitude component and a phase component, determining a phase selection by selecting from N possible phase selections for each phase of the phase component, generating a phase select parameter and a modified phase for each phase based on the phase selection for each phase, generating a clock signal with a frequency controlled by the modified phase, creating one or more shifted clock signals with a shift in phase of the clock signal, selecting an input clock signal from the clock signals and the one or more shifted clock signals according to the phase select parameter, driving a PA by the magnitude component according to the input clock signal to generate a RF signal, and transmitting the RF signal on a wireless medium.

Another aspect of the present invention provides a device wirelessly connected to a wireless communication network, the device includes a receiver, transmitter, processor, and one or more memory banks, communicatively coupled to the processor and storing processor readable codes that, when executed by the processor in conjunction with the receiver and transmitter, is configured for converting baseband complex data into a magnitude component and a phase component, determining a phase selection by selecting from N possible phase selections for each phase of the phase component, generating a phase select parameter and a modified phase for each phase based on the phase selection for each phase, generating a clock signal with a frequency controlled by the modified phase, creating one or more shifted clock signals with a shift in phase of the clock signal, selecting an input clock signal from the clock signals and the one or more shifted clock signals according to the phase select parameter, driving a PA by the magnitude component according to the input clock signal to generate a RF signal, and transmitting the RF signal on a wireless medium.

In some embodiments, a polar transmitter includes a cartesian to polar conversion module, a frequency modulation (FM) reduction module, a Phase Lock Loop (PLL), a quadrature generator, an amplitude modulation (AM) module, a phase select multiplexer, and a PA (e.g., a DPA, an SCPA, etc.). The cartesian to polar conversion module receives baseband complex data and converts the received baseband complex data from cartesian coordinates to polar coordinates, based on using the received baseband complex data to generate a corresponding magnitude component and a corresponding phase component comprising the converted polar representation. The FM reduction module receives phases of the phase component from the cartesian to polar conversion module, determines a phase selection by selecting from N possible phase selections for each phase of the phase component, and generates a phase select parameter, a modified phase, and a sign parameter for each phase based on the phase selection. N is a positive integer. The PLL is coupled to the FM reduction module to receive the modified phase and generate a clock signal with a frequency controlled by the modified phase. The quadrature generator generates a shifted clock signal based on applying or performing one or more configured phase shifts to the clock signal. The AM module receives the magnitude component from the cartesian to polar conversion module, and receives the sign parameter for the magnitude component from the FM reduction module. The phase select multiplexer receives the phase select parameter from the FM reduction module, receives the signed magnitude from the AM module, and generates an I input and a Q input. The PA coupled to the phase select multiplexer and quadrature generator, which is driven to generate an RF signal by the I input and Q input according to the clock signal and the shifted clock signal received from the quadrature generator. An embodiment of the PA is a SCPA. In some embodiments, the polar transmitter further includes a frequency divider coupled to the PLL quadrature generator. The frequency divider divides the frequency of the clock signal to generate a divided clock signal, which is output to the quadrature generator (e.g., which generates a shifted divided clock signal, from the divided clock signal). In such embodiments, the PA is driven according to the divided clock signal and the shifted divided clock signal.

EXAMPLE EMBODIMENTS

FIG. 1 is a block diagram illustrating an exemplary wireless communication network 100. In some aspects, the wireless communication network 100 can be an example of a Wireless Local Area Network (WLAN). As used herein, a WLAN may be a Wi-Fi network. In some examples, the WLAN 100 can be a network implementing at least one of the IEEE 802.11 family of wireless communication protocol standards (e.g., such as that defined by the IEEE 802.11-2020 specification or amendments thereof including, but not limited to, 802.11ah, 802.11ay, 802.11ax, 802.11az, 802.11ba and 802.11be). The WLAN 100 may include at least one AP 102 and multiple associated STAs 104. For example, the STAs 104 can include a first STA 104a, a second STA 104b, a third STA 104c, a fourth STA 104d, etc. While only one AP 102 is shown, the WLAN network 100 also can include multiple APs 102.

Each of the STAs 104a-104d may be referred to as a Mobile Station (MS), a mobile device, a mobile handset, a wireless handset, an Access Terminal (AT), a User Equipment (UE), a Subscriber Station (SS), and/or a subscriber unit, among other examples. The STAs 104 may represent various devices such as mobile phones, handheld devices, netbooks, computers, tablet computers, laptops, display devices (e.g., TVs, computer monitors, navigation systems, etc.), music or other audio or stereo devices, remote control devices ("remotes"), printers, kitchen or other household appliances, key fobs (e.g., for Passive Keyless Entry and Start (PKES) systems), etc.

A single AP 102 and an associated set of STAs 104a-104d may be referred to as a Basic Service Set (BSS), which is managed by the respective AP 102. FIG. 1 additionally shows an example coverage area 106 of the AP 102, which may represent a Basic Service Area (BSA) of the WLAN 100. The BSS may be identified to users by a Service Set Identifier (SSID), as well as to other devices by a Basic Service Set Identifier (BSSID), which may be a Medium Access Control (MAC) address of the AP 102.

The AP 102 periodically broadcasts beacon frames ("beacons") including the BSSID to enable any STAs (e.g., such as one or more, or all, of the STAs 104a-104d) within wireless range of the AP 102 to associate or re-associate with the AP 102 to establish a respective communication link 108a-108d (e.g., hereinafter also referred to as a "Wi-Fi link"). For example, the first STA 104a can establish a respective communication link 108a with the AP 102, the second STA 104b can establish a respective communication link 108b with the AP 102, the third STA 104c can establish a respective communication link 108c with the AP 102, the fourth STA 104d can establish a respective communication link 108d with the AP 102, etc. The STAs 104a-104d may additionally use the beacon frames broadcast by AP 102 to maintain the respective communication link 108a-108d with the AP 102. For example, the beacons can include an identification of a primary channel used by the respective AP 102 as well as a timing synchronization function for establishing or maintaining timing synchronization with the AP 102. The AP 102 may provide access to external networks to various STAs in the WLAN via respective communication links 108.

To establish the communication links 108a-108d with an AP 102, each of the respective STAs 104a-104d can perform passive or active scanning operations ("scans") on frequency channels in one or more frequency bands. For example, to perform passive scanning, each of the STAs 104a-104d listens for beacons that are transmitted by the AP 102 at a periodic time interval referred to as the Target Beacon Transmission Time (TBTT). The TBTT can be measured in Time Units (TUs). In some examples, one TU may be equal to 1024 microseconds ($\mu$s). In some examples, the TBTT can have a default value of 102.4 milliseconds (ms). To perform active scanning, each of the STAs 104a-104d can generate and sequentially transmit probe requests on each channel to be scanned and listens for probe responses from the AP 102. Each of the STAs 104a-104d may be configured to identify or select an AP 102 with which to associate (e.g., based on the scanning information obtained through the passive or active scans), and to perform authentication and association operations to establish a respective communication link 108a-108d with the selected AP 102. The AP 102 assigns an Association Identifier (AID) to each of the STAs 104a-104d at the culmination of the association operations, which the AP 102 uses to track the STAs 104a-104d.

In some cases, one or more of the STAs 104a-104d may have the opportunity to select one of many BSSs within range of the STA or to select among multiple APs 102 that together form an Extended Service Set (ESS) including multiple connected BSSs. An extended network station associated with the WLAN 100 may be connected to a wired or wireless distribution system that may allow multiple APs 102 to be connected in an ESS. In some examples, one or more of the STAs 104a-104d can be covered by more than one AP 102 and can associate with different APs 102 at different times for transmissions. After association with an AP 102, one or more of the STAs 104a-104d also may be configured to periodically scan its surroundings to find a more suitable AP with which to associate. For example, a given one of the STAs 104a-104d that is moving away from its associated AP 102 may perform a "roaming" scan to find another AP having more desirable network characteristics (e.g., such as a greater Received Signal Strength Indicator (RSSI), a reduced traffic load, etc.).

In some cases, the STAs 104a-104d may form networks without APs 102 or other equipment other than the STAs 104a-104d themselves. One example of such a network is an ad hoc network. Some examples of an ad hoc network are mesh networks and peer-to-peer (P2P) networks. In some cases, ad hoc networks may be implemented within a larger wireless network In such implementations, while the STAs 104a-104d may be capable of communicating with each other through the AP 102 using the respective communication links 108a-108d, the STAs 104a-104d, the STAs may also communicate directly with each other using direct wireless links 110. In some examples, two STAs may communicate via a direct communication link 110 regardless of whether both STAs 104 are associated with and served by the same AP 102. In such an ad hoc system, one or more of the STAs 104a-104d may assume the role filled by the AP 102 in a BSS. Such a STA may be referred to as a Group Owner (GO) and may coordinate transmissions within the ad hoc network. Examples of direct wireless links 110 can include one or more of Wi-Fi Direct connections, connections established by using a Wi-Fi Tunneled Direct Link Setup (TDLS) link, and other P2P group connections, etc.

The APs 102 and STAs 104a-104d may function and communicate using the respective communication links 108a-108d according to at least one of the IEEE 802.11 wireless communication protocol standards. These standards define the WLAN radio and baseband protocols for the physical (PHY) and Medium Access Control (MAC) layers. For example, the APs 102 and STAs 104a-104d transmit and receive wireless communications to and from one another in the form of PHY Protocol Data Units (PPDUs) or Physical Layer Convergence Protocol (PLCP) PDUs. The APs 102 and STAs 104a-104d in the WLAN 100 may transmit PPDUs over a license or unlicensed spectrum, which may be a portion of spectrum that includes frequency bands traditionally used by Wi-Fi technology, such as the 2.4 GHz band, the 5 GHz band, the 60 GHz band, the 3.6 GHz band, and the sub-1 GHz band. Some implementations of the APs 102 and STAs 104a-104d described herein also may communicate in other frequency bands, such as the 6 GHz band, which may support both licensed and unlicensed communications. The APs 102 and STAs 104a-104d also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11 standards and specifications may be transmitted over frequency bands that are divided into multiple 20 MHz channels. In such examples, the PPDUs are transmitted over a physical channel having a minimum bandwidth of 20 MHz, although other channel bandwidths are also possible. In some cases, a larger bandwidth channel can be formed using channel bonding, which bonds together multiple channels each of the minimum bandwidth.

Each PPDU is a composite structure that includes a PHY preamble and a payload in the form of a PHY Service Data Unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

FIG. 2A is a high-level block diagram of an exemplary wireless communication device 200 that can be used to implement a STA or an AP, in some examples. The wireless communication device 200 can include a MAC layer and a PHY layer in accordance with one or more of the IEEE 802.11 standards.

The wireless communication device 200 includes a Radio Frequency (RF) transmitter module 202, an RF receiver module 204, an antenna unit 206, one or more memory banks 208, input and output interfaces 210, and communication bus 212. The RF transmitter module 202 and the RF receiver module 204 include a modem (modulator-demodulator device), which transmits data by modulating one or more carrier wave signals to encode digital information, as well as receives data by demodulating the signal to recreate the original digital information. As illustrated, the wireless communication device 200 further includes a MAC processor 214, a PHY processor 216 and a HOST processor 218. These processors can be any type of Integrated Circuit (IC) including a general processing unit, an Application Specific Integrated Circuit (ASIC) or Reduced Instruction Set Computer-Five (RISC-V) based ICs, amongst others.

The memory 208 can be used to store software and/or computer-readable instructions, including software or instructions that can be used to implement at least some functions of the MAC layer. For example, each processor included in the wireless communication device 200 (e.g., MAC processor 214, PHY processor 216, HOST processor 218, etc.) executes respective software to implement the functions of the respective communication/application layer.

The PHY processor 216 includes a transmitting signal processing unit and a receiving signal processing unit (not shown) and can be used to manage the interface with the Wireless Medium (WM). The PHY processor 216 operates on PPDUs by exchanging digital samples with the radio module which includes the RF transmitter 202, the RF receiver 204, analog-to-digital converters, and digital filters.

The MAC processor 214 executes MAC level instructions and manages the interface between the application software and the WM, through the PHY processor 216. The MAC processor 214 is responsible for coordinating access to the WM so that the Access Point (AP) and STAs in range can communicate effectively. The MAC processor 214 adds header and tail bytes to units of data provided by the higher levels and sends them to the PHY layer for transmission. The reverse happens when receiving data from the PHY layer. If a frame is received in error, the MAC processor 214 manages the retransmission of the frame.

The HOST processor 218 interfaces with the MAC layer and is responsible for running higher level functionalities of the wireless communication device.

The PHY processor 216, the MAC processor 214, the HOST processor 218, the peripheral bus 220, the memories 208, and the input/output interfaces 210 communicate with each other via the peripheral bus 212. The peripheral bus 220 connects to a number of peripherals that support core functions of the wireless communication device 200, including timers, interrupts, radio/filters/system registers, counters, UART, GPIO interfaces, among others. The memory 208 may further store an operating system and applications. In some examples, the memory may store recorded information about captured frames and packets. The input/output interface unit 210 allows for exchange of information with a user of the wireless communication device. The antenna unit 206 can include a single antenna and/or can include or multiple antennas. For example, multiple antennas can be used to implement Multiple Input Multiple Output (MIMO) techniques, among others.

Figure 2B:
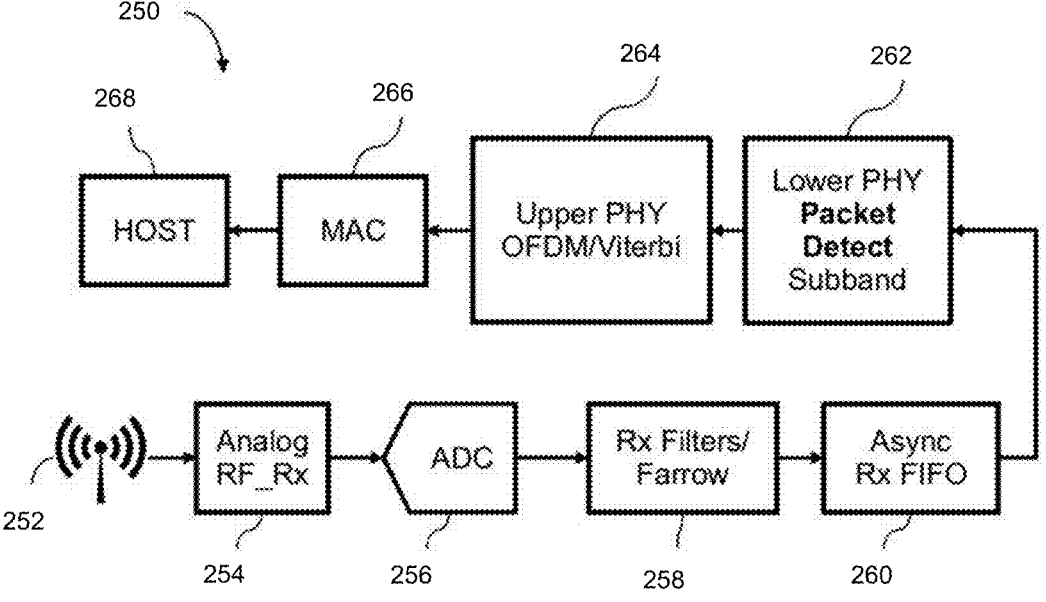
FIG. 2B is a schematic block diagram of the receiver data flow architecture of the wireless communication device of FIG. 2A, in accordance with some examples.

FIG. 2B illustrates a schematic block diagram of a receiver data flow architecture 250 that can be used to receive Wi-Fi packets over the network. In one illustrative example, the receiver data flow architecture 250 illustrated in FIG. 2B can correspond to or otherwise be associated with the wireless communication device 200 illustrated in FIG. 2A. Radio signals are received over the WM and translated into electrical signals by the receiving antenna 252 (e.g., which can be the same as or similar to antenna 206). The received signal is conditioned using a series of analog filters 254 (e.g., depicted as analog RF receive (Rx) filters) before being converted into a digital signal equivalent using an Analog-to-Digital Converter (ADC) 256. The sampled signal output of ADC 256 is conditioned again using a filter bank 258, which can include one or more digital RF filters and/or a farrow, before the samples are collected in an asynchronous receiving First-In-First-Out (FIFO) data structure 260.

Samples in FIFO structure 260 can be accessed by a plurality of modules. For example, samples can be accessed by a packet detect module and a sub-band module, both of which may be included in the lower-level PHY portion 262 depicted in FIG. 2B. In some embodiments, the lower-level PHY portion 262 is itself included in the PHY processor 216 illustrated in FIG. 2A.

The packet detect module included in the lower-level PHY portion 262 can include hardware and/or implement algorithms that can be used to analyze the initial sections of the PPDU in the time domain. Based on the analysis, the packet detect module can be used to recognize a received frame and synchronize frequency and timing of the wireless communication device with the packet being received. The sub-band module included in the lower-level PHY portion 262 can include hardware and/or implement algorithms that can be used to detect which subchannel in the allocated frequency band is being used for the packet being received.

Once a packet is detected and the relevant subchannel is established, samples can be forwarded to an upper-level PHY portion 264. The upper-level PHY portion 264 can be included in the PHY processor 216 illustrated in FIG. 2A. In some aspects, upper-level PHY portion 264 can be used to process and decode Orthogonal Division Multiplexing (OFDM) symbols (e.g., with the support of a coprocessor module) to reconstruct the full PPDU. The reconstructed PPDU is output by the upper-level PHY portion 264 and subsequently processed by the MAC layer processor 266. The MAC layer processor 266 can be used to extract the data payload from the PPDU and provide the relevant information to the HOST layer 268 for consumption.

In some examples, the MAC layer processor 266 illustrated in FIG. 2B can be the same as or similar to the MAC processor 214 illustrated in FIG. 2A. In some cases, the HOST layer 268 illustrated in FIG. 2B can include or otherwise can be the same as or similar to the HOST processor 218 illustrated in FIG. 2A.

Figure 2C:
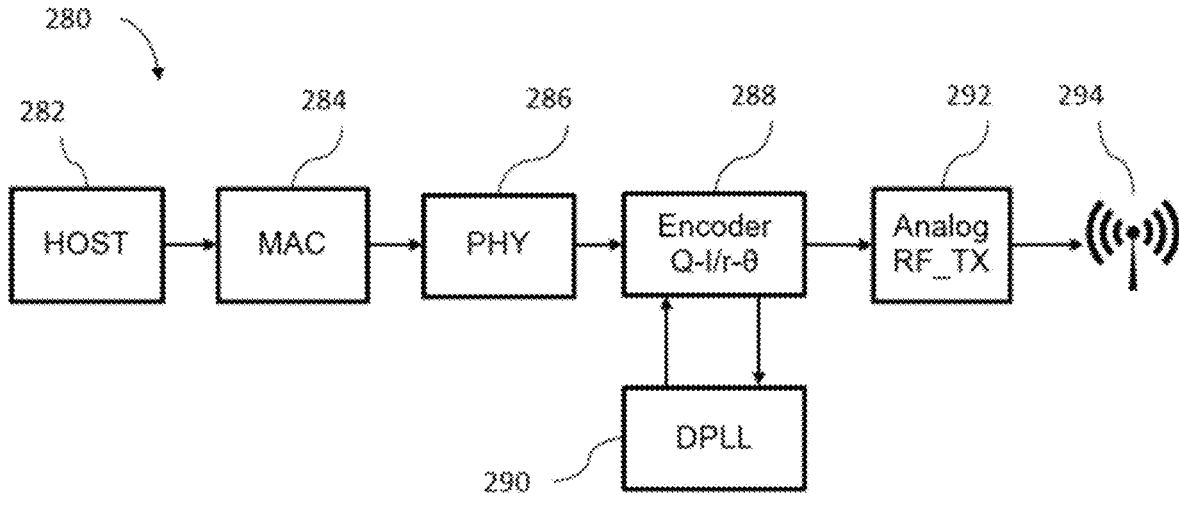
FIG. 2C is a schematic block diagram of a transmitter data flow architecture that can be used to transmit Radio Frequency (RF) signals over a wireless medium, in accordance with some examples.

FIG. 2C is a schematic block diagram of a transmitter data flow architecture 280 that can be used to transmit RF signals over a wireless medium, in accordance with some examples. More particularly, FIG. 2C illustrates a simplified schematic block diagram of a transmitter data flow architecture 280 used for transmitting radio signals over a WM. Data can be generated from a HOST or APP module 282 and packaged in a MAC level Protocol Data Unit (MPDU) to be routed over the wireless network by the MAC management module 284. The PHY module 286 interfaces with the WM and compiles a PPDU by adding a PHY preamble and the tail to the MPDU. Usually a Modulation Coding Scheme (MCS) for transmission of the packet over the medium is established using a rate control algorithm by the MAC module 284 or the PHY module 286. The modulation scheme selected can define the modulation technique to be used to transmit the data on the WM and the coding rate. Based on the modulation scheme selected, for example Quadrature Amplitude Modulation (QAM) 64, the PPDU is modulated to be transmitted on the WM. The encoder module 288 generates signals corresponding to points of QAM constellation symbols (groups of bits of the PPDU) which can be encoded using polar (r-θ) or cartesian (Q-I) coordinates. The modulation is done by linking the encoder module 288 to a Digital Phase Lock Loop (DPLL) 290. The modulated signals may be filtered by analog filters 292 and transmitted using a transmitting antenna 294.

As noted previously, the systems and techniques described herein can be used to provide polar transmission and/or polar transmitters with a lower frequency modulation (FM) range requirement for transmitting an RF signal. For example, an FM reduction module (also referred to as an FM range reduction module, etc.) can be included in a polar transmitter, and can be used to reduce the required FM range for performing polar transmission using a given bandwidth of the modulated signal. In some aspects, the FM range of a polar transmitter can refer to the frequency range requirement of a local oscillator (LO) included in the polar transmitter. For example, the FM range of a polar transmitter can be the frequency range requirement of a LO output frequency due to modulation of the phase path. Conventionally, the FM range increases when the bandwidth of the modulated signal increases. For instance, the FM range for an IEEE 802.11ah signal transmitted on a 2 MHz channel is 32 MHz, the FM range for an IEEE 802.11n signal transmitted on a 20 MHz channel becomes 240 MHz, etc. A larger FM range for a polar transmitter and/or LO thereof can correspond to an increased number of capacitors required by the chip design for the polar transmitter, thus also requiring a larger silicon area for providing the necessary LO tracking banks. The capacitors used in these LO tracking banks for increasing the FM range of a conventional polar transmitter can also be highly sensitive to supply voltage fluctuations, which can increase the cost, challenge, and/or complexity with providing polar transmitter implementations with large FM ranges and correspondingly large LO tracking banks of capacitors. Furthermore, increasing the FM range by providing more capacitors in larger silicon area LO tracking banks increases the parasitic capacitance of the polar transmitter, which can make it difficult to achieve a wide tuning range while also providing a large FM range for the LO. Accordingly, it would be desirable to reduce the FM range of the LO of a polar transmitter, for a given bandwidth and/or modulation.

Figure 3:
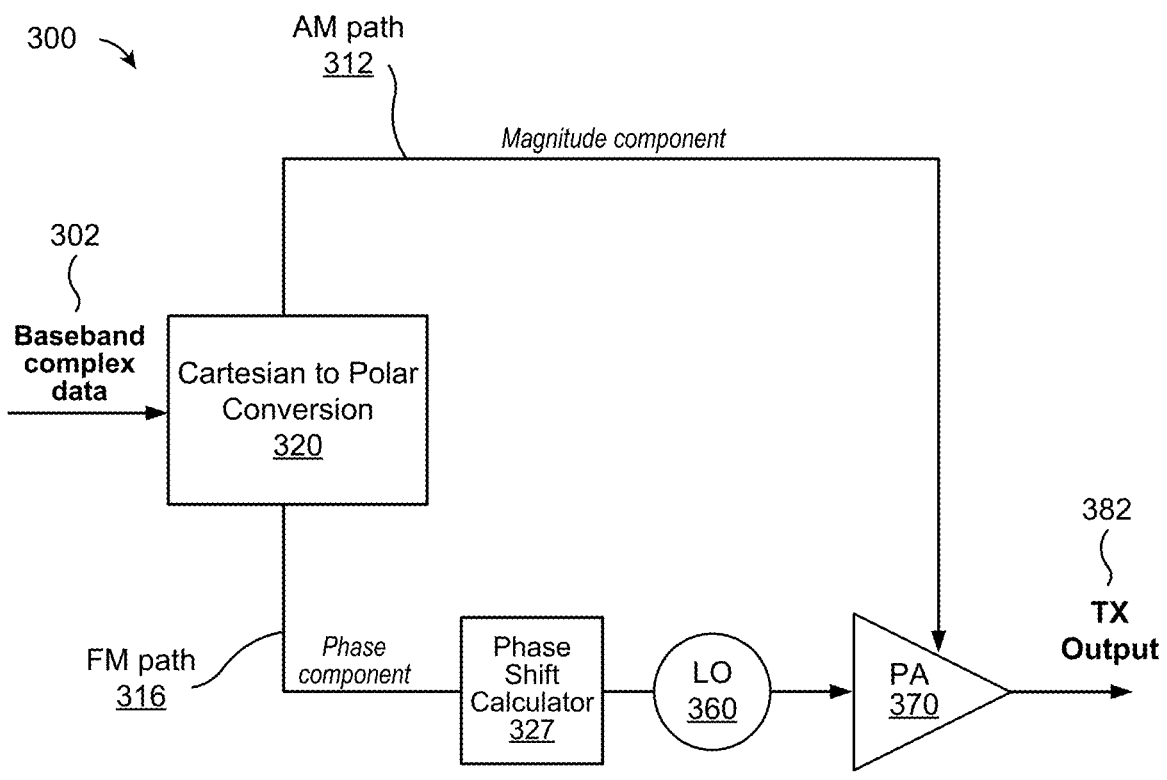
FIG. 3 is a block diagram illustrating an example of a polar transmitter including a first path associated with magnitude signal components and a second path associated with phase signal components, in accordance with some examples.

FIG. 3 is a block diagram illustrating an example of a polar transmitter 300 having separate paths for magnitude and phase components of an input signal (e.g., such as the baseband complex data 302). For example, the polar transmitter architecture of FIG. 3 includes a first path associated with magnitude components of an input signal (e.g., baseband complex data 302, etc.) and includes a second path associated with phase components of the input signal (e.g., baseband complex data 302). The first path, associated with the magnitude component(s), can be referred to as an amplitude modulation (AM) path 312. The second path, associated with the phase component(s), can be referred to as a frequency modulation (FM) path 316.

In some aspects, the magnitude and phase components of the input signal can be generated as respective outputs of the cartesian to polar conversion module 320 that is included in the polar transmitter 300. For example, the cartesian to polar conversion module 320 can receive as input a cartesian signal comprising the baseband complex data 302, and can generate as output a cartesian-to-polar converted signal comprising a separate magnitude component (provided to the AM path 312 from the cartesian to polar conversion module 320) and a separate phase component (provided to the FM path 316 from the cartesian to polar conversion module 320). In some examples, the cartesian to polar conversion technique shown in FIG. 3 and/or implemented by the cartesian to polar conversion module 320 can be seen to allow for a 6 decibel (dB) increase in output power compared to a comparable direct conversion cartesian transmitter.

In a polar transmitter (e.g., such as the polar transmitter 300 of FIG. 3), the baseband signal (e.g., baseband complex data 302) is interpolated to a desired Oversampling Rate (OSR) to ensure that the polar transmitter and its corresponding transmissions meet one or more applicable Error Vector Magnitude (EVM) and/or Spectral Emission Mask (SEM) requirements. More particularly, the interpolated signal can converted from cartesian to polar coordinates by a cartesian to polar conversion module, such as the cartesian to polar conversion module 320, to thereby create a magnitude component transmitting on an Amplitude Modulation (AM) path 312 and configured to drive a power amplifier (PA) 370 of the polar transmitter 300, and to create a phase component transmitting on a Frequency Modulation (FM) path 316 and configured to drive a local oscillator (LO) 360 of the polar transmitter 300.

In some embodiments, the polar transmitter 300 may include a phase shift calculator module 327, which may be provided on the FM path 316 coupled to an output of the cartesian to polar conversion module 320. For example, the phase shift calculator module 327 can receive as input the phase component that is generated as output by the cartesian to polar conversion module 320, as described above. In some aspects, the phase shift calculator module 327 can be configured to generate as output a phase value corresponding to a calculated phase shift value required on the FM path 316. For example, the phase shift calculator module 327 can be configured to obtain the phase inputs generated by the cartesian to polar conversion module 320, and can unwrap the phase inputs from the cartesian to polar conversion and then differentiate the unwrapped phase over time. By unwrapping the phase inputs of the cartesian to polar conversion module 320 and then differentiating over time, the phase shift calculator module 327 can be used to transform from a phase value from the CORDIC to phase values that correspond to frequency shifts. In some aspects, the phase values corresponding to frequency shifts that are determined by the phase shift calculator module 327 can be the same as or similar to one or more of the frequency shifts and/or phase values described below with respect to the examples of FIGS. 12-15 and the corrections implemented and described therein. In some examples, the phase shift calculator module 327 of FIG. 3 may be the same as or similar to one or more of the phase shift calculator module 627 of the polar transmitter 600 of FIG. 6, the phase shift calculator module 727 of the polar transmitter 700 of FIG. 7, and/or the phase shift calculator module 827 of the polar transmitter 800 of FIG. 8, etc.

In some embodiments, the phase inputs from the cartesian to polar conversion module 320 can be unwrapped by the phase shift calculator 327 based on adding or subtracting multiples of 360° to remove any ±180° wrapping in phase when needed (e.g., based on adjusting the phase values to remove discontinuities corresponding to the cyclic characteristics of the phase. For example, the unwrapped phase can correspond to a continuous phase trajectory or phase progression over time, that does not have sudden jumps (e.g., discontinuities) of ±180°. Both the phase input provided to the phase shift calculator 327 from the cartesian to polar conversion module 320, and the unwrapped phase generated by the phase shift calculator 327, may be expressed in units of degrees over time. The subsequent differentiation of the unwrapped phase by the phase shift calculator 327 can be performed as a differentiation over time. The differentiation can generate as output the phase shift, in units of degree, also over time.

In one illustrative example of cartesian to polar conversion that can be implemented by or using the cartesian to polar conversion module 320, the cartesian constellations [(1,1), (1,−1), (−1,−1), (−1,1)] will be converted into the corresponding polar constellations) [(1,45°), (1,135°), (1,275°), (1,315°)]. Modern modulation techniques like Orthogonal Frequency Division Multiplexing (OFDM) have signal trajectories in the complex plane which frequently approach and cross the origin. Along these signal trajectories, the phase of the signal changes rapidly, which requires large frequency shifts from the LO 360 in order for the polar transmitter 300 to generate the baseband signal information close enough to ideal to achieve the required EVM and SEM. In other words, to meet EVM and/or SEM requirements, a conventional polar transmitter implementing OFDM or other modern modulation techniques requires a large range of frequency shifts from the LO 360, which increases the complexity and silicon area needed for the LO 360, as well as for the polar transmitter 300 as a whole.

For radio systems which use low baseband bandwidth (e.g., such as Bluetooth (BT) radio systems, etc.), a polar transmitter can be implemented without the need for significant AM and FM ranges. However, higher bandwidth modulation schemes such as OFDM have much higher demands on the AM and FM paths and/or bandwidths, which makes the use of polar transmitters significantly harder to achieve in implementation and design. In some aspects, the frequency range requirement of a LO output frequency due to modulation of the phase path can be referred to as the "FM range" of the LO (e.g., LO 360) and/or the "FM range" of the polar transmitter (e.g., polar transmitter 300). The FM range increases when the bandwidth of the modulated signal increases, for example, the FM range for an IEEE 802.11ah signal transmitted on a 2 MHz channel is 32 MHZ, while the FM range for an IEEE 802.11n signal transmitted on a 20 MHz channel becomes 240 MHz. A larger FM range increases the number of capacitors required in the chip design, thus requiring a larger silicon area for LO tracking banks. These capacitors are also very sensitive to supply voltage fluctuations. Furthermore, increasing the FM range increases the parasitic capacitance, which makes it difficult to achieve a wide tuning range while providing a large FM range for the LO. Reducing the FM range of the LO is desirable to make the polar transmitter design feasible.

A challenge associated with existing polar transmitter designs and implementations is that a signal tends to have poor linearity in the low amplitude region. Poor linearity in low amplitude regions can be caused by carrier feed-through when the envelope (e.g., signal envelope) approaches zero, which tends to drive the drain voltage of the PA close to zero. To address high peak-to-average power ratio and/or poor power efficiency, some solutions for polar transmitter designs are configured to punch a vector hole into the constellation diagram of the vector I/Q (In-phase/Quadrature phase) waveform so that the magnitude of the envelope does not drop close to a zero value, thereby avoiding a situation where the drain voltage becomes very low.

In some aspects, to overcome the problem of an excessive Frequency Modulation (FM) range required by the phase trajectory of an interpolated baseband signal being converted from cartesian to polar coordinates, embodiments of the present invention provide a polar transmitter architecture which significantly reduces the FM range required on the Local Oscillator (LO) in a radio system. For example, the silicon area used to implement LO tracking banks for the polar transmitter can be greatly reduced, corresponding to the reduction in the FM range, as the number of capacitors in the LO tracking banks is based on the size of the needed FM range. The reduction in FM range of the polar transmitter(s) described herein can advantageously allow polar transmitters with a relatively high transmission power to be used in modern, wider bandwidth modulation techniques such as OFDM, among various others. Some embodiments of the present invention dynamically change the clock input into a Power Amplifier (PA), such as a Switched Capacitor Power Amplifier (SCPA), where the PA/SCPA clock input is dynamically switched or changed between a configured set of clock inputs each having different phases to thereby reduce the FM range needed for the LO, especially for wireless signals transmitted on a relatively wide bandwidth.

In some embodiments, the PA or SCPA clock input is dynamically switched between one of four possible phases: a first clock input phase selection corresponding to a positive in-phase (I+), a second clock input phase selection corresponding to a negative in-phase (I−), a third clock input phase selection corresponding to a positive quadrature-phase (Q+), and a fourth clock input phase selection corresponding to a negative quadrature phase (Q−). For example, FIG. 4 is a diagram illustrating an example embodiment of four possible phase selections 400 for the SCPA or other PA included in a polar transmitter according to the aspects of the present disclosure, where the possible phase selections 400 include a positive in-phase (I+) phase configuration or selection, a negative in-phase (I−) phase configuration or selection, a positive quadrature-phase (Q+) phase configuration or selection, and a negative quadrature-phase (Q−) phase configuration or selection.

In some examples, the polar transmitter can be configured to select a phase from the four possible phases, and feed a clock input with the selected phase into the SCPA. The selection and switching between selected phases from the set of configured or possible phases can be used to effectively change the phase of the polar transmitter output by +180° (π radians), −180° (−π radians), +90° (π/2 radians), or −90° (−π/2 radians), without needing and/or performing frequency modulation as in conventional polar transmitters. Accordingly, for a polar transmitter implemented according to the systems and techniques described herein, the required FM range of the LO can be reduced. For example, in some aspects, the systems and techniques can reduce the required FM range of the LO of a polar transmitter to a quarter (e.g., 25%) of the original or otherwise required FM range for the LO of a conventional polar transmitter, thereby reducing the silicon area needed to implement the polar transmitter and making polar modulation more practical for large bandwidth schemes like OFDM.

In some cases, each time an interpolated baseband signal crosses the origin, the LO of a polar transmitter must implement a 180° phase shift on the LO. A 180° phase shift is the worst case for a polar transmitter as the phase change is maximized. For example, an interpolated baseband signal crossing the origin from the Q+ to Q− phase selection points of FIG. 4 can correspond to a 180° phase shift on the LO (e.g., between the Q+ and Q− phases). Similarly, an interpolated baseband signal crossing the origin from the I+ to I− phase selection points of FIG. 4 can also correspond to a 180° phase shift on the LO (e.g., between the I+ and I− phases).

Figure 4:
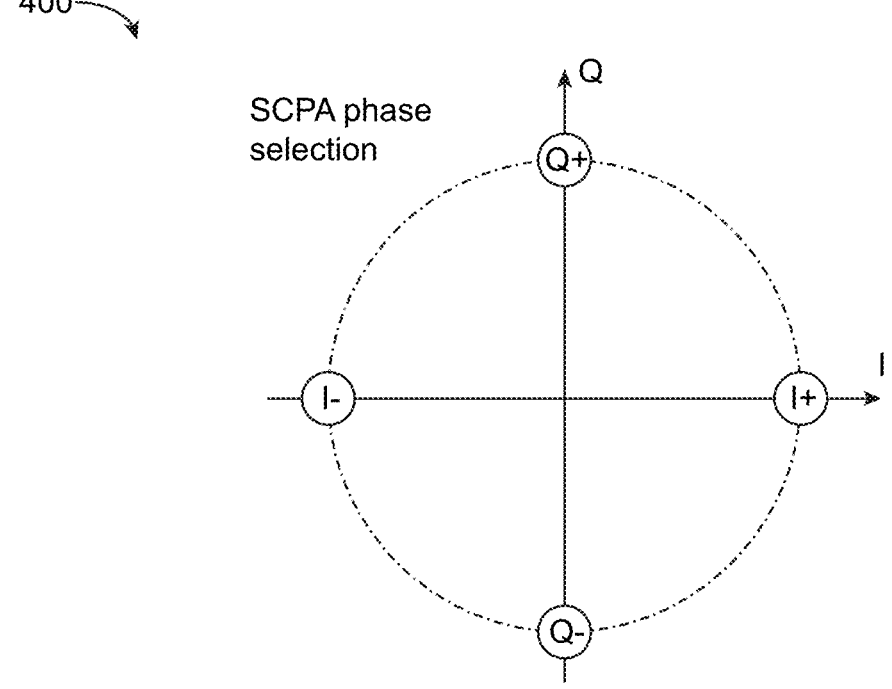
FIG. 4 is a diagram illustrating an example of switch capacitor power amplifier (SCPA) phase selection, corresponding to the four phase selections including positive in-phase (I+), negative in-phase (I−), positive quadrature-phase (Q+), and negative quadrature-phase (Q−), in accordance with some examples.

FIG. 5 is a graph illustrating an example of frequency modulation (FM) variation 500 associated with SCPA phase selection, such as an SCPA phase selection performed according to the four possible phase selections illustrated in FIG. 4 and described above. In particular, FIG. 5 shows a first frequency modulation variation 502, corresponding to a polar transmitter implemented according to aspects of the present disclosure (e.g., where selection of a phase into the SCPA is used to reduce the required FM range), and a second frequency modulation variation 508, corresponding to a conventional polar transmitter directly driving the LO with the phase change. FIG. 5 also illustrates a phase selection out 504. Phase selection out 504 illustrates the SCPA phase selection in FIG. 4, specifically, in FIG. 5, the phase switches from I+ to I−. As seen in the example of FIG. 5, selecting a phase into the SCPA results in a frequency modulation variation 502 that is significantly reduced compared to the frequency modulation variation 508 (e.g., where the frequency modulation variation 508 corresponds to directly driving the LO with the phase change). In some examples, for a cartesian to polar coordinate conversion module operating at 320 MHz to achieve EVM and SEM requirements, the LO will shift in frequency by 160 MHz for a period of 1/320 MHz in order to advance the LO phase by 180° as shown in FIG. 5.

Figure 6:
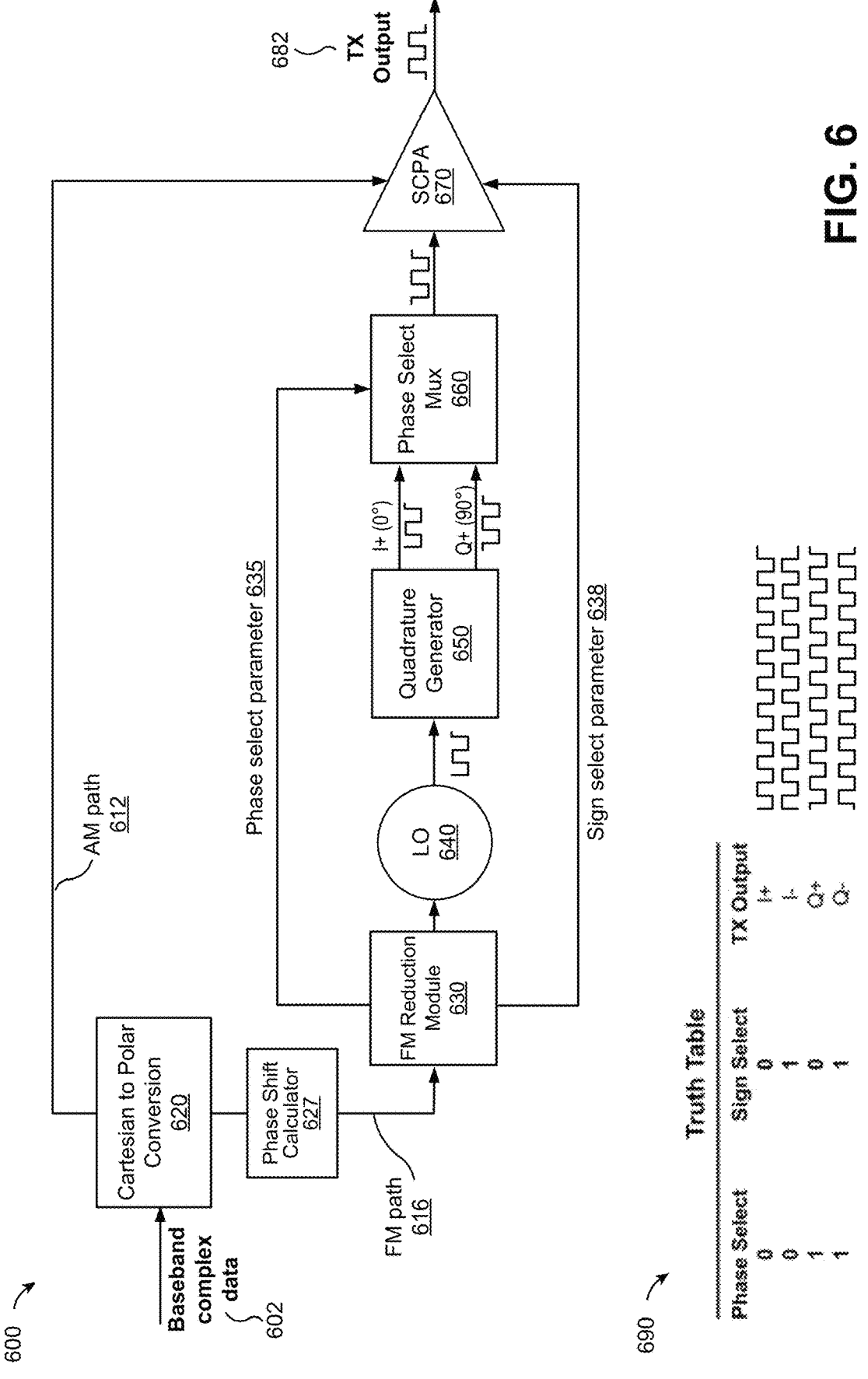
FIG. 6 is a diagram illustrating an example architecture of a polar transmitter including an FM reduction module, in accordance with some examples.

FIG. 6 is a diagram illustrating an example architecture for a polar transmitter 600 with an FM reduction module 630, in accordance with some examples. As will be described in further detail below, the FM reduction module 630 can be used to reduce the FM range associated with the polar transmitter 600. As illustrated, the polar transmitter 600 can include a cartesian to polar conversion module 620 configured to receive as input baseband complex data 602. The baseband complex data 602 can comprise I and Q components. The cartesian to polar conversion module 620 can convert the baseband complex data 602 into a polar form (e.g., a magnitude and a phase).

For instance, the cartesian to polar conversion module 620 can generate a first output comprising magnitudes of the baseband data 602, wherein the magnitude information of the polar conversion is outputted onto an AM path 612 of the polar transmitter 600. The cartesian to polar conversion module 620 can additionally generate a second output comprising phases of the baseband data 602, wherein the phase information of the polar conversion is outputted onto an FM path 616 of the polar transmitter 600. As noted above, compared to a conventional polar transmitter directly modulating an LO with the phases of the baseband data, the systems and techniques described herein can use the FM reduction module 630 to receive the phases of the baseband data 602 as input phases to derive a phase selection and a modified phase.

In some embodiments, the FM reduction module 630 receives an input comprising the signal on the FM path 616 (e.g., phase information generated as output from the cartesian to polar conversion module 620 on the FM path 616). In some embodiments, the polar transmitter 600 can include a phase shift calculator module 627, provided on the FM path 616 between the output of the cartesian to polar conversion module 620 and the input of the FM reduction module 630. In one illustrative example, the phase shift calculator module 627 of FIG. 6 can be the same as or similar to one or more of the phase shift calculator module 327 of FIG. 3, 727 of FIG. 7, 827 of FIG. 8, etc. The phase shift calculator module 627 can be configured to receive the phase inputs generated by the cartesian to polar conversion module 620, and can unwrap these phase inputs and then differentiate the unwrapped phase over time. By unwrapping the phase inputs of the cartesian to polar conversion module 620 and then differentiating over time, the phase shift calculator module 627 can be used to transform from a phase value from the CORDIC to phase values that correspond to frequency shifts. The FM reduction module 630 may receive as input the phase shift information and/or phase values corresponding to frequency shifts, as determined by the upstream phase shift calculator module 627 coupled to the input of the FM reduction module 630. The FM reduction module 630 can generate or derive a phase selection or phase selection information, corresponding to a phase select parameter 635 that is provided from the FM reduction module 630 to a downstream phase select multiplexer 660. The FM reduction module 630 can additionally generate or derive a modified phase, based at least in part on a sign select parameter 638 that is provided from the FM reduction module 630 to the downstream phase select multiplexer 660.

In one illustrative example, and as depicted in the example of FIG. 6, the FM reduction module 630 is configured to perform the phase selection and determine one or more (or both) of the phase select parameter 635 and/or the sign select parameter 638, based on the FM reduction module 630 selecting one out of the four possible phase selections, I+, I−, Q+, and Q−, e.g., as shown in FIG. 4, for each input phase of the phase information received over the FM path 616.

It is also possible for the polar transmitter 600 to use a quantity N of possible phase selections or phase selection candidates that is greater than or lesser than the example of N=4. For example, in some embodiments, the FM reduction module 630 can be configured to select one out of two phase selection candidates (e.g., N=2), or can be configured to select one out of eight possible phase selections (e.g., N=8), etc. For eight phase selection candidates, each phase selection is 45° (π/4 radians) apart from its neighboring phases.

In some embodiments, the phase selection for each input phase can be determined by the FM reduction module 630 and may be represented by two parameters: a phase select parameter 635 and a sign select parameter 638. For example, the truth table 690 of FIG. 6 illustrates the respective phase selections that are represented by various combinations of the phase select parameter 635 and the sign select parameter 638. In the truth table 690, the phase selection of I+ is represented by setting the phase select parameter 635 equal to 0 and setting the sign select parameter 638 equal to 0; the phase selection of I− is represented by setting the phase select parameter 635 equal to 0 and setting the sign select parameter 638 equal to 1; the phase selection of Q+ is represented by setting the phase select parameter 635 equal to 1 and setting the sign select parameter 638 equal to 0; and the phase selection of Q− is represented by setting the phase select parameter 635 equal to 1 and setting the sign select parameter 638 equal to 1.

The phase select parameter(s) 635 are output from the FM reduction module 630 to a phase select multiplexer 660 (Mux), whereas the sign select parameter(s) 638 are output from the FM reduction module 630 to the SCPA 670. In some embodiments, the phase selection and/or phase select4 parameter 635 can be determined according to the input phase provided over the FM path 616 from the cartesian to polar conversion module 620. For example, the phase selection can be I+ when the input phase is between −π/4 and π/4 (e.g., input phase<45° or input phase≥315°); the phase selection can be Q+ when the input phase is between π/4 and 3π/4 (e.g., 45°≤input phase<135°); the phase selection can be I− when the input phase is between 3π/4 and π or between −π and −3π/4 (e.g., 135°≤input phase<225°); and the phase selection can be Q− when the input phase is between −3π/4 and −π/4 (e.g., 225°≤input phase<315°).

The FM reduction module 630 can additionally be configured to compute a modified phase for each input phase, based on the corresponding phase selection determined for each input phase. For example, if the current input phase is 140° and the previous input phase is 40°, the phase selection changes from I+ to Q+ with a modified phase of 50°. The modified phase of 50° is used to modulate the LO 640 instead of the input phase difference of 100°, such that the corresponding frequency modulation is smaller than directly modulating the LO using the input phase differences of the baseband data 602.

In some embodiments, the phase selection may be determined based on the input phase as well as the input phase difference in consecutive input phases. In such examples, the phase selection will not be changed if the phase difference in consecutive input phases is less than a threshold. For example, if a current input phase is 60° and the previous input phase is 40°, the phase selection can be left unchanged (e.g., as I+), based on a determination that the input phase difference of 20° is less than the configured threshold phase difference for changing the phase selection.

In some embodiments, the frequency of a clock signal generated by the LO 640 is controlled by the modified phase output from the FM reduction module 630. The LO 640 can generate and output the clock signal to a quadrature generator 650 also included in the polar transmitter 600. The quadrature generator 650 can receive the clock signal from the LO 640, and can generate one or more shifted or modified clock signals based on the input clock signal from the LO 640. For instance, the quadrature generator 650 can generate a shifted clock signal that is advanced (e.g., phase shifted) by 90° relative to the input clock signal from the LO 640. The input clock signal from the LO 640 can also be referred to as an original, un-modified, un-shifted or non-shifted, etc., clock signal. The quadrature generator 650 thus creates a pair of I and Q clock signals, shown in FIG. 6 as the I clock signal on the upper output branch from the quadrature generator 650 and the Q clock signal on the lower output branch from the quadrature generator 650.

The phase select mux 660 can receive as input the set of clock signals from the quadrature generator 650 (e.g., where the set of clock signals includes the original/un-shifted clock signal, and includes the one or more phase shifted clock signals generated by the quadrature generator 650). From the set of clock signals, the phase select mux 660 can be configured to select one clock signal generated by the quadrature generator 650, where the selection is based on and/or according to the phase select parameter 635 determined by the FM reduction module 630. The selected clock signal can be output from the phase select mux 660 to the SCPA 670. In some aspects, the selected clock signal at the input of the SCPA 670 can be either I+ or Q+. The remaining two phase selection clock signals (e.g., I– and Q–) can be obtained by setting the sign select parameter 638 to cause the SCPA 670 to invert/negate the sign of the selected clock signal, for example with the selected clock signal inverted/negated by the SCPA 670 based on the SCPA 670 receiving the sign select parameter 638 with a value of 1, etc.

The magnitudes on the AM path 612 (e.g., the magnitude information of the baseband complex data 602, generated as the polar converted output from the cartesian to polar conversion module 620) are used to drive the SCPA 670 with the selected clock signal as described above. The SCPA 670 generates a polar transmitter output signal 682 to be transmitted on a wireless medium.

In some aspects, the use of both the I and Q channels (e.g., of the baseband complex data 602 and/or phase selections 690) for a polar transmitter may introduce the problem of I/Q phase imbalance that is suffered by traditional direct-conversion cartesian transmitters. For example, in the polar transmitter, the I/Q phase imbalance may manifest as errors in the phase trajectory which will reduce EVM. Accordingly, some embodiments of the FM reduction module 630 in the polar transmitter 600 can correct I/Q phase imbalance based on using an algorithm to provide a correction term of the phase imbalance. For instance, one approach or implementation of the I/Q phase offset correction algorithm can be provided to add or multiply the phase imbalance to the output of the FM path 616 when computing the phase change. For example, for –10° of I/Q phase imbalance, when processing a current phase at 0° (on I+) with a phase shift of +95°, a phase selection decision at the FM reduction module 630 that jumps from I+ to Q+ will give only +80° of phase shift due to the I/Q phase imbalance. The remaining phase shift of 10° will need to be added to the modified phase. In another example, when processing a current phase at 0° (on I+) with a –80° phase shift, jumping from I+ to Q– will give +100° due to the –10° I/Q phase imbalance. The phase shift overshoot of 10° will need to be subtracted from the modified phase.

Figure 7:
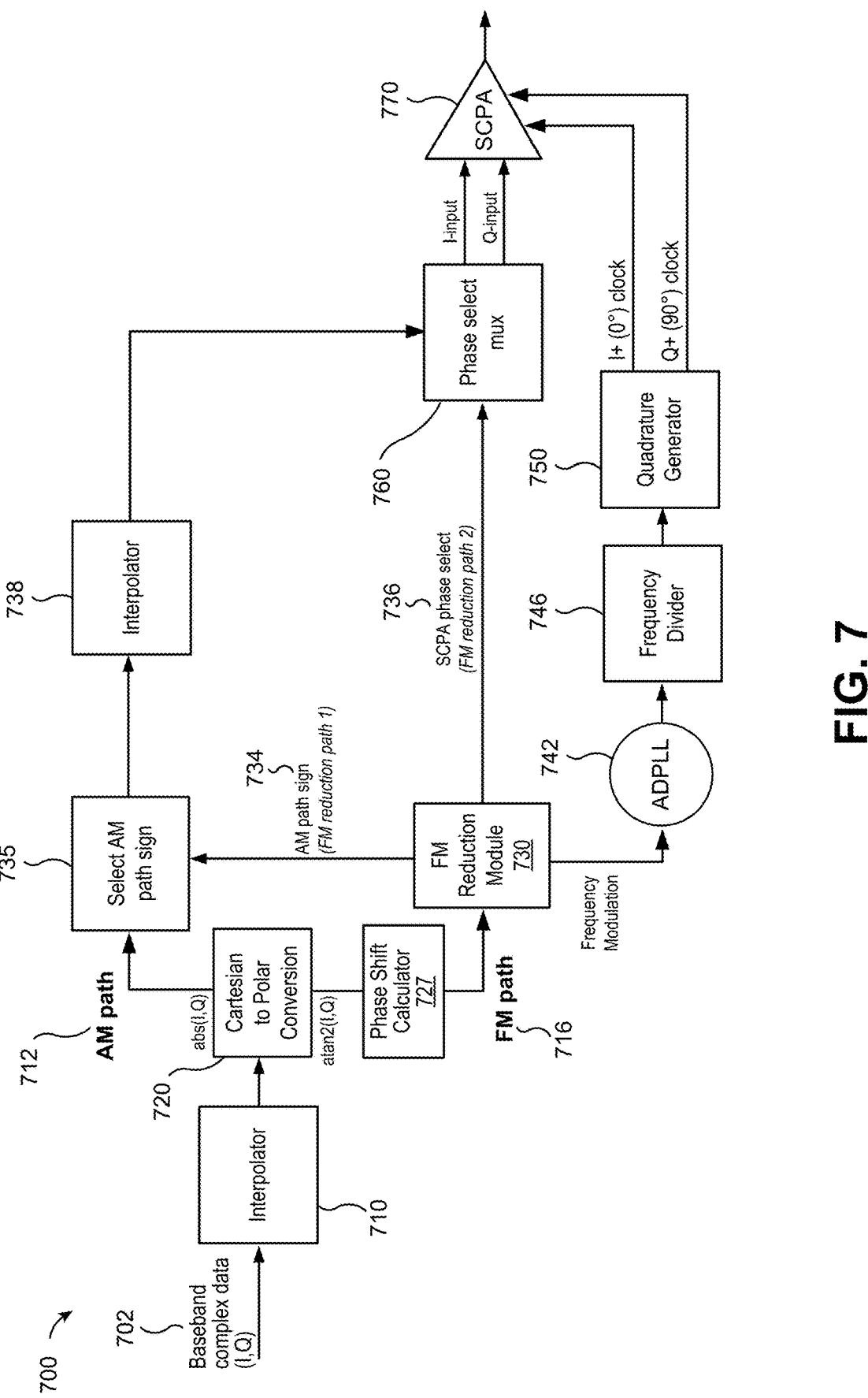
FIG. 7 is a diagram illustrating another example architecture of a polar transmitter including an FM reduction module, in accordance with some examples.

FIG. 7 is a diagram illustrating another example architecture of a polar transmitter 700 with a FM reduction module 730, according to another embodiment of the present invention. In some aspects, the polar transmitter 700 of FIG. 7 can be similar to the polar transmitter 600 of FIG. 6, and the FM reduction module 730 of FIG. 7 can be similar to the FM reduction module 630 of FIG. 6. An input signal comprising baseband complex data 702 can be the same as or similar to the baseband complex data 602 of FIG. 6. A cartesian to polar conversion module 720 can be the same as or similar to the cartesian to polar conversion module 620 of FIG. 6. A quadrature generator 750 can be the same as or similar to the quadrature generator 650 of FIG. 6. A phase select multiplexer (mux) 760 can be the same as or similar to the phase select mux 660 of FIG. 6. The SCPA 770 of FIG. 7 can be the same as or similar to the SCPA 670 of FIG. 6.

In some embodiments, the baseband complex data 702, carrying I and Q components, are processed by an interpolator 710 of the polar transmitter 700 of FIG. 7. The interpolator 710 can be followed by a cartesian to polar conversion module 720. The output of the cartesian to polar conversion module 720 includes an absolute value of the baseband complex data 702 (e.g., the magnitude abs (I,Q), provided on the AM path 712 coupled to a first output of the cartesian to polar conversion module 720), and an angle of the complex data 702 (e.g., the phase a tan 2(I,Q), provided on the FM path 716 coupled to a second output of the cartesian to polar conversion module 720).

The FM reduction module 730 included in the polar transmitter 700 of FIG. 7 can be configured to receive phases of the baseband data 702 (e.g., the a tan 2(I,Q) output from the cartesian to polar conversion module 720) on the FM path 730. In some embodiments, the polar transmitter 700 can include a phase shift calculator module 727, provided on the FM path 716 between the output of the cartesian to polar conversion module 720 and the input of the FM reduction module 730. In one illustrative example, the phase shift calculator module 727 of FIG. 7 can be the same as or similar to one or more of the phase shift calculator module 327 of FIG. 3, 627 of FIG. 7, 827 of FIG. 8, etc. The phase shift calculator module 727 can be configured to receive the phase inputs generated by the cartesian to polar conversion module 720 (e.g., the angle of the complex data 702, or the phase a tan 2(I,Q), provided on the FM path 716 as noted above). The phase shift calculator module 727 can unwrap these phase inputs and then differentiate the unwrapped phase over time. By unwrapping the phase inputs of the cartesian to polar conversion module 720 and then differentiating over time, the phase shift calculator module 727 can be used to transform from a phase value from the CORDIC to phase values that correspond to frequency shifts. The FM reduction module 730 may receive as input the phase shift information and/or phase values corresponding to frequency shifts, as determined by the upstream phase shift calculator module 727 coupled to the input of the FM reduction module 730.

In one illustrative example, the FM reduction module 730 can be used to determine an AM path sign 734 (e.g., a sign for the AM path 712) and to determine a phase select parameter 736 for each input phase. The SCPA phase select parameter 736 can be similar to and/or can correspond to the path selection parameter 635 of FIG. 6. The AM path sign 734 can be similar to and/or can correspond to the sign select parameter 638 of FIG. 6.

The AM path sign 734 can be implemented as a one bit data for controlling the sign of the magnitude in the AM path 712. In one example, when the input phase (e.g., from the cartesian to polar conversion module 720 performing polar conversion for the baseband complex data 702) changes from 0° to 180°, instead of sending a phase select parameter (e.g. selecting –I, 180° from +I) to the phase select mux 760, the FM reduction module 730 can be configured to instead send the one bit of AM path sign 734 data to a select AM path sign module 735 to change the sign of the magnitude on the AM path 712 from positive to negative. The sign change of the magnitude on the AM path 712 can be equivalent to the 180° phase shift achieved by switching between I and Q phase select parameters.

The FM reduction module 730 also outputs the phase select parameter 736 (e.g., SCPA phase select) indicating one of the possible phase selections to the phase select mux 760, as described previously with respect to the phase select parameter 635 provided to the phase select mux 660 of FIG. 6. Again the same as or similar to the example of FIG. 6, the polar transmitter 700 of FIG. 7 can use the FM reduction module 730 to generate a modified phase for each input phase. The modified phase for each input phase is used to frequency modulate an All Digital Phase Lock Loop (ADPLL) 742 coupled to the FM reduction module 730. For example, the ADPLL 742 input can be coupled to an output of the FM reduction module 730, such that the ADPLL 742 receives the modified phase determined by the FM reduction module 730 for each input phase of the polar converted baseband complex data 702.

In some embodiments, the ADPLL 742 generates a clock signal having a frequency controlled by the modified phase. In some embodiments, the ADPLL 742 includes an algorithm to correct for linear drift in the LO gain when given a correction term of the LO gain gradient. For example, the ADPLL 742 can implement a linear drift correction for the LO gain based on receiving as input a correction term for the LO gain gradient. The correction term can be calculated dynamically or in substantially real-time, can be calculated offline or be pre-determined, or various combinations thereof. In some aspects, an accurate estimate of the gain of the LO is required so that FM is performed without excessive under and/or overshoot of LO settling which can lead to degradation of EVM and SEM. For larger LO tracking banks, the LO gain may vary due to matching variations between the individual tracking bank units over large areas of silicon. Overshoot or undershoot of the LO will distort the I/Q waveform from the ideal or intended waveform shape. The tracking loop is also disturbed and takes time to settle. This effect is most significant at the extremes of the tracking range, for example, between +160 MHz and −160 MHz frequency shifts.

In another illustrative example, consider a digitally-controlled oscillator (DCO) with a 9-bit integer tracking bank of 511 unit capacitors and a 7-bit fractional tracking bank equal to (or otherwise corresponding to) one unit capacitor. In the context of the example, the integer tracking bank of the DCO may have a desired FM range of 32 MHz (e.g., ±16 MHz). The required LO gain (e.g., kDCO) to cover the 32 MHz desired FM range can be approximately 62.5 kHz per tracking unit. In some examples, in-silicon implementations can have a greater or otherwise increased kDCO, for example to cover process, voltage, temperature (PVT) variations and/or to provide headroom, etc.

FIG. 12 is a graph 1200 illustrating an example of the number of tracking units enabled for FM by a digitally-controlled oscillator (DCO) operating at an LO frequency of 920 MHz. In the example graph 1200 of FIG. 12, the number of tracking units enabled for the DCO is shown on the vertical axis, with different FM frequencies on the horizontal axis. In some embodiments, the graph 1200 can correspond to the example DCO described above, which includes the 9-bit integer tracking bank of 511 unit capacitors and 7-bit fractional tracking back equal to one unit capacitor. In some examples, the graph 1200 of FIG. 12 can be based on bench measurements of the number of tracking units enabled when performing FM for a DCO operating at an LO frequency of 920 MHz (e.g., such as the example DCO above). When FM is not being performed by the DCO, the number of tracking units that are turned on is centered around mid tracking code (255).

FIG. 13 is a graph 1300 illustrating an example of the effective required LO gain (e.g., kDCO) for performing FM by the DCO associated with graph 1200 of FIG. 12. For example, the data within graph 1200 of FIG. 12 can be reformulated to obtain the effective kDCO across the same FM range, as shown in graph 1300 of FIG. 13 (e.g., the horizontal axis and scale of graph 1300 can be the same as or similar to those of graph 1200 of FIG. 12; while the vertical axis of graph 1300 represents the effective LO gain, kDCO, rather than showing the number of tracking units as in graph 1200). As can be seen from the graph of effective required LO gain 1300 of FIG. 13, the mean kDCO for the tracking bank is 74.3 kHz across the desired ±16 MHz FM range, varying from 67.6 kHz to 80.5 kHz at the extremes.

The ideal or optimal kDCO (e.g., LO gain) for a particular FM range can be given as the average value of kDCO between the start and stop FM values that define the particular FM range. For example, for the response depicted in graph 1300 of FIG. 13, and considering a scenario in which the FM input to the ADPLL changes from an initial value of 0 MHz to an updated value of 16 MHz, the corresponding kDCO values at the initial FM value (e.g., 0 MHz) and the updated FM value (e.g., 16 MHZ) can be obtained. For instance, the kDCO value at the 0 MHz FM frequency is 74.2 kHz, and the kDCO value at the 16 MHz FM frequency is 80.5 kHz. Accordingly, the kDCO value which minimizes LO undershoot and/or overshoot for this FM jump from 0 MHz to 16 MHz will be 77.34 kHz (e.g., the average of the kDCO values at the initial and updated FM values, (74.2+80.5)/2=77.34).

The optimal or ideal kDCO value of 77.34, which minimizes LO undershoot/overshoot for the FM jump differs from the mean kDCO of the whole tracking bank, which is 74.3 kHz. Accordingly, using the mean kDCO of the tracking bank as an input to the ADPLL and/or using the mean kDCO of the tracking bank to configure the ADPLL will result in the activation of more tracking units than needed (e.g., the mean kDCO of the tracking bank, which in this example is lower than the optimal or ideal kDCO, causes the ADPLL to turn on additional tracking units).

For example, when the ADPLL uses the mean kDCO of the tracking bank (e.g., 74.3 kHz), the number of tracking units turned on by the ADPLL is equal to 16e+6/74.3e+3=215.34. When the ADPLL uses the optimal or ideal kDCO value of 77.34 (e.g., calculated as the average kDCO between the FM endpoints), the correct number of tracking units turned on by the ADPLL is equal to 16e+6/77.34e+3 =206.88 tracking units. The number of additional tracking units is the difference of 215.34-206.88=8.46 additional tracking units. Turning on too many tracking units (e.g., turning on additional tracking units beyond the correct number required by the ADPLL) will cause the LO to overshoot in frequency, which can be undesirable.

In some aspects, the ideal kDCO value can depend on both the updated FM value of an FM input, and the previous FM value of an FM input (e.g., the updated FM value may be the current FM input value, and the previous FM value may be the immediately prior FM input value). Changing from the previous FM input value to the current (e.g., updated) FM input value can correspond to a jump between (e.g., from) the previous FM input value to the current/updated FM input value.

Figure 14:
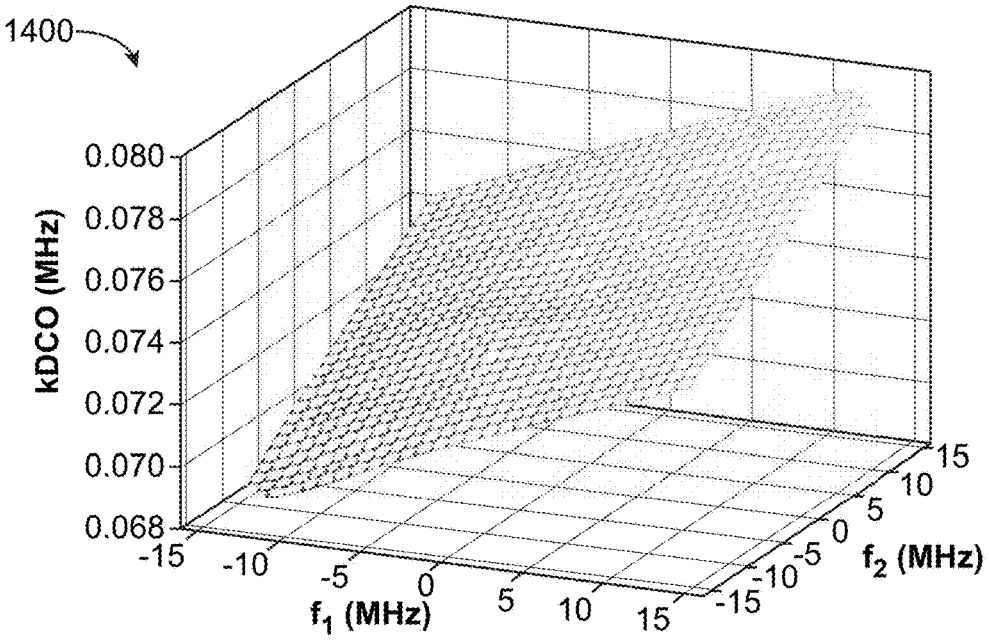
FIG. 14 is a graph illustrating an example of the measured kDCO values for FM between a previous frequency and an updated frequency, in accordance with some examples.
Figure 15:
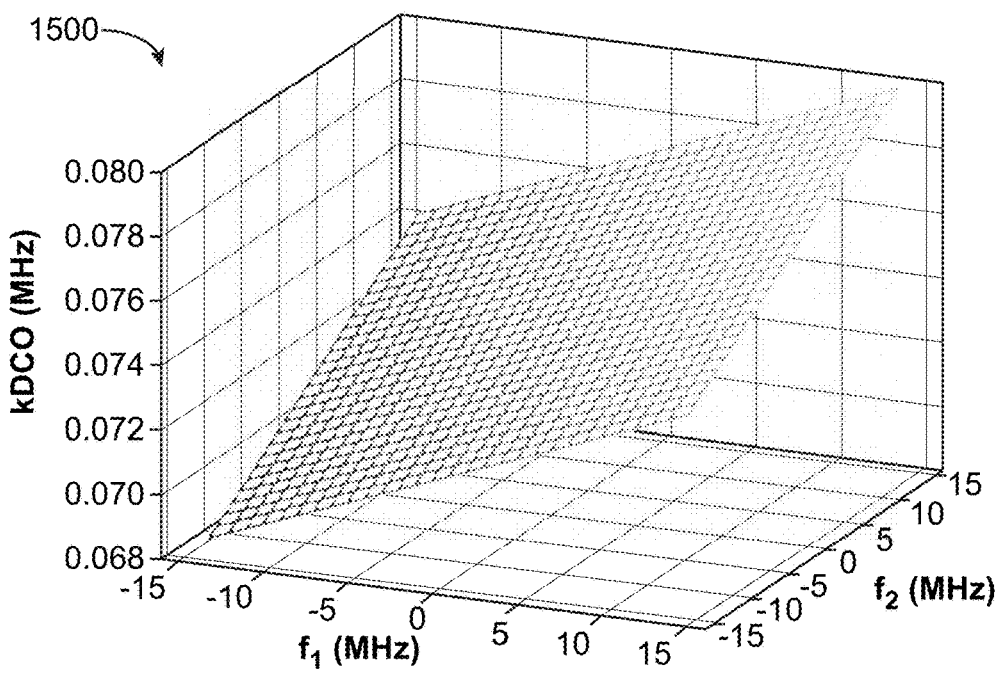
FIG. 15 is a graph illustrating an example of a calculated plane for LO gain gradient correction, in accordance with some examples.

As the ideal kDCO value depends on both the previous and the updated FM values, the LO gain correction function can be represented as a surface. For instance, FIG. 14 is a graph 1400 illustrating bench measured values of the kDCO that minimize LO frequency undershoot/overshoot when performing FM between various combinations of a previous frequency (e.g., frequency $f_1$, shown on the first horizontal axis of graph 1400) and a current/updated frequency (e.g., frequency $f_2$, shown on the second horizontal axis of graph 1400).

In some embodiments of the present invention, a plane fit can be used to calculate an optimal or ideal kDCO value to minimize the LO frequency undershoot/overshoot for each successive FM input (e.g., each successive FM input to an ADPLL, etc.). For example, the plane fit can be implemented for the three-dimensional surface of the measured kDCO values shown in graph 1400 of FIG. 14, where the plane fit is simplest to implement in terms of digital resources while maintaining reasonable levels of accuracy and resultant performance. In one illustrative example, the plane fit to calculate the LO gain gradient correction term can be implemented using the form: $0.5*a(f_1+f_2)+b$. Here, the terms a and b can be obtained using a linear fit of the FM against kDCO, for instance such as the response shown in graph 1300 of FIG. 13. Various other fitting functions and forms are also possible, and may be utilized within the scope of the present disclosure. For example, various other fitting functions, forms, equations, etc., in addition to, or alternative to the example plant fit described above, can also be utilized for calculating the LO gain gradient correction. In some aspects, greater demands on transmitter modulation accuracy may be met by using higher order functions for fitting to the surface of the ideal kDCO values. For instance, a paraboloid or other higher order function can be used to better represent the ideal kDCO surface, at the cost of greater computational complexity and digital resources used in the implementation thereof.

In one illustrative example of an LO gain correction implementation that can be utilized by aspects of the present invention, a kDCO value can be updated in response to changes in frequency of or for a DCO. For example, a frequency shift corresponding to a change in value from $f_0$ to $f_1$ can trigger an update to the kDCO value. Prior to the frequency shift, the current frequency value is $f_0$; after the frequency shift, the current frequency value is $f_1$, and the frequency value $f_0$ becomes the previous frequency value. In response to the frequency shift from $f_0$ to $f_1$, the kDCO value is updated to be optimal for the $f_0$ to $f_1$ frequency shift, for instance using the plane fitting approach for the LO gain correction as described above with respect to FIGS. 14 and 15. In some embodiments, the new, optimal kDCO value can be calculated based on configuring the equation $kDCO=0.5*a(f_1+f_0)+b$ with the appropriate current frequency value $f_1$ and the appropriate previous frequency value $f_0$, with the terms a and b being obtained using a linear fit of the FM against kDCO, as described previously above. For example, the terms a and b can be pre-determined and stored in memory, with each LO frequency corresponding to a different set of stored a and b values for the LO gain correction function.

In some embodiments, the change in kDCO can be delayed to align with the delay of the frequency shift of the DCO through the ADPLL logic. For example, an optimal delay can be coupled to the output of the kDCO value update function, and/or a delay module can be coupled to the output of the kDCO value update function and may be optionally enabled or disabled to implement (or not implement, respectively) the delay between the change in kDCO and the delay of the frequency shift of the DCO.

Consider an example of the AM and FM paths of a 2 MHz IEEE 802.11ah packet for a CORDIC operating at an OSR of 16. In a conventional polar transmitter, several frequency shifts greater than 8 MHz are required as the I/Q path traverses around and through the origin of the complex plane. By using a signed AM path 712 at the output of the CORDIC as shown in FIG. 7, large phase shifts can be achieved by changing the sign of the magnitude (e.g., via the select AM path sign module 735, etc.) to introduce a 180° phase shift. This sign change is sent through the interpolation chain (e.g., corresponding to interpolator 738, etc.) to the transmitter data inputs.

In some aspects, a frequency divider 746 in the example architecture of the polar transmitter 700 of FIG. 7 can be configured to receive the clock signal from the ADPLL 742 and divide the clock signal. Typically operating the LO (e.g., ADPLL 742) at a higher multiple of the desired RF output frequency reduces the phase noise and LO transmission coupling. For example, the LO (e.g., ADPLL 742) may run at four times the desired RF output frequency (e.g., output frequency of or associated with the output of the SCPA 770, etc.), and the frequency divider 746 can be configured to divide the clock signal from the LO/ADPLL 742 by the same factor of four, to thereby set the clock signal frequency to the desired RF output frequency. In some aspects, the drawbacks of operating a fast LO can include the required FM range of the polar transmitter being relatively high, and the use of the frequency divider 746 can therefore be seen to reduce the required FM range of the polar transmitter 700.

In the example architecture of the polar transmitter 700 shown in FIG. 7, a quadrature generator 750 receives the divided clock signal from the frequency divider 746, and can use the divided clock signal to generate as output two clock signals (e.g., a first clock signal output comprising an I+ clock signal, and a second clock signal output comprising a Q+ clock signal), each with 90° phase shift. The quadrature generator 750 outputs these two clock signals to an SCPA 770.

As noted previously, an AM sign selector (e.g., select AM path sign module 735) can receive the magnitude on an AM path 712 output from the cartesian to polar conversion module 720, as well as an AM path sign parameter 734 from the FM reduction module 730. The AM sign selector module 735 can generate a signed magnitude output, based on outputting the magnitude on the AM path 712 with the same sign (e.g., in response to receiving a first value of the AM path sign parameter 734, such as 0) or based on outputting the magnitude on the AM path 712 with the inverted or negated sign (e.g., in response to receiving a second value of the AM path signa parameter 734, such as 1).

The signed magnitude output from the AM sign selector module 735 is processed by an interpolator 738 followed by the phase select mux 760. The phase select mux 760 generates an I-input and a Q-input according to the phase select parameter 736 provided by the FM reduction module 730, and further based on the output of the interpolator 738 on the AM path 712. The I-input and Q-input are generated by the phase select mux 760 and provided to the SCPA 770, which is coupled to the phase select mux 760. At the SCPA 770, the I-input and Q-input (from the phase select mux 760) are combined with the two clock signals (e.g., I+ and Q+ clock signals) output from the quadrature generator 750, and are used to generate a polar transmitter output signal for transmission on a wireless medium by the polar transmitter 700.

In some aspects, embodiments of the polar transmitters according to the present disclosure can be seen to not only inherit the 6 dB output power improvement, but to also provide compatibility and support for use in transmitting modulated signals on higher bandwidths. Advantageously, this increase in output power may allow for a significantly larger coverage area of a radio system without the need for an additional Power Amplifier (PA). For a conventional polar transmitter in an IEEE 802.11ah communication system to satisfy the SEM requirements for 4 MHz mode, an oversampling ratio (OSR) of about 16 is required, which results in running the cartesian to polar conversion module at 64 MHz. The FM range of the LO at RF is +/−32 MHZ, which causes a significant increase in the silicon area for the tracking banks for the LO.

In the example architecture of the polar transmitter 600 of FIG. 6, the different phase selections are implemented based on the inputs to the SCPA 670. For instance, sign changes can be implemented at the SCPA 670 level, based on the sign select parameter 638 being provided at the input of SCPA 670 and/or being provided to the phase select mux 660 coupled to the input of the SCPA 670. Similarly, jumping between I and Q phases can be performed at the SCPA 670 level, based on phase select mux 660 clock signal output provided to the SCPA 670 as input.

In the example architecture of the polar transmitter 700 of FIG. 7, sign changes can be implemented at the output of the cartesian to polar conversion module 720, based on including the AM path sign selection module 735 and the AM path sign parameter 734 generated as output from the FM reduction module 730. In the example of FIG. 7, while sign changes can be performed at the output of the cartesian to polar conversion, jumping between I and Q phases is still performed at the SCPA 770 level.

Figure 8:
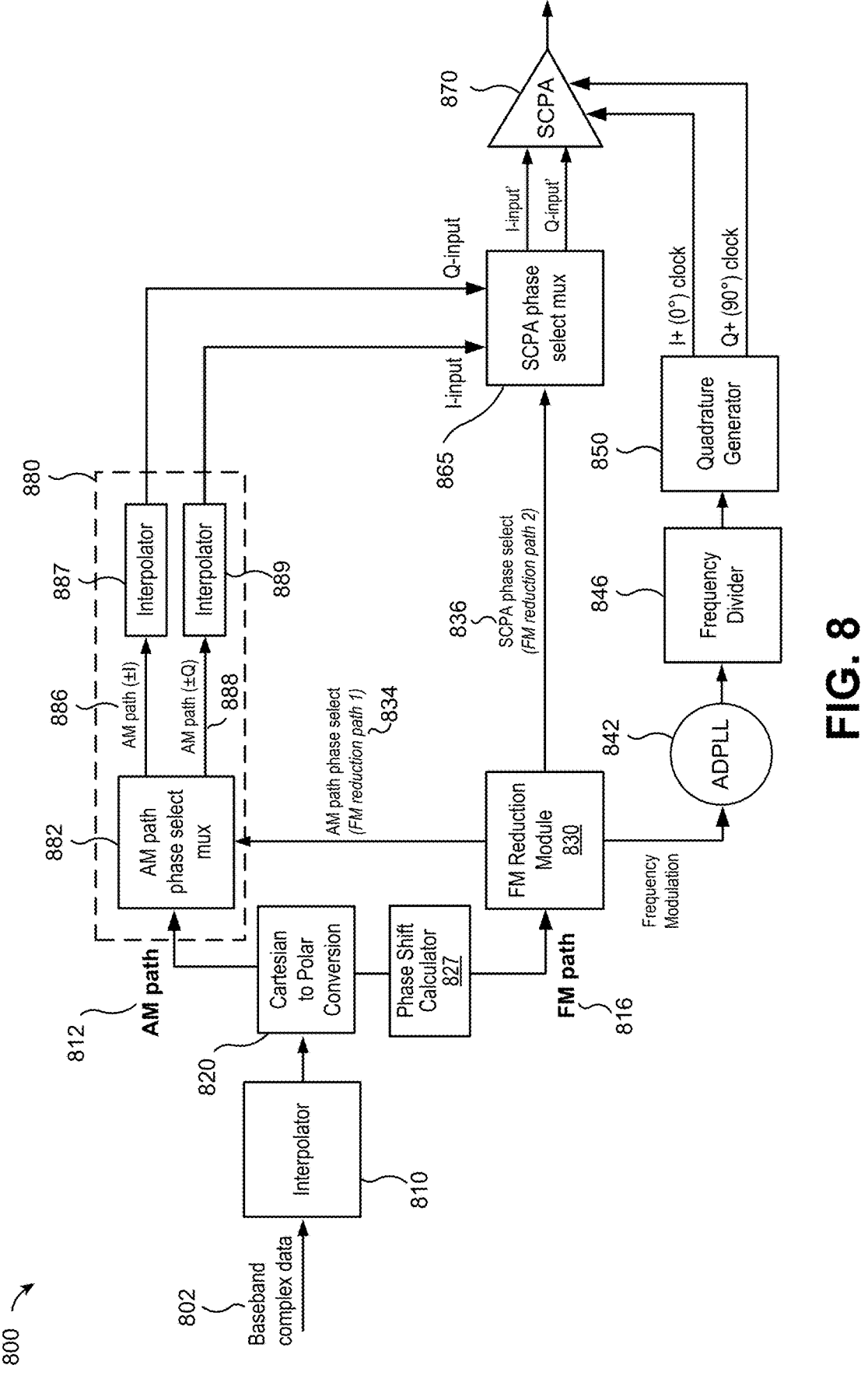
FIG. 8 is a diagram illustrating an example architecture of a polar transmitter including an FM reduction module, that may be based on the example polar transmitter architecture of FIG. 7, in accordance with some examples.

Accordingly, in some embodiments, a polar transmitter with FM range reduction can be provided with the ability to implement or perform both sign changes and jumping between I and Q phases at the output of the cartesian to polar conversion (e.g., before the SCPA level). For instance, FIG. 8 is a diagram illustrating an example architecture of a polar transmitter 800 including an FM reduction module 830 and configured to perform sign changes and jumps between I and Q phases at the output of the cartesian to polar conversion module 820 (e.g., before the SCPA 870 level), in accordance with some examples. Advantageously, performing both sign changes and/or jumps between I and Q phases at the output of the cartesian to polar conversion module 820/before the SCPA 870 level can allow the polar transmitter architecture 800 to better align (or perfectly align) transitions at the input to the SCPA 870, thereby improving SEM for the polar transmitter 800.

In some aspects, the polar transmitter 800 of FIG. 8 can be similar to and/or can be based at least in part on the example polar transmitter 700 architecture of FIG. 7. In some examples, the polar transmitter 800 of FIG. 8 can be similar to the polar transmitter 600 of FIG. 6 and/or 700 of FIG. 7. For example, the FM reduction module 830 of FIG. 8 can be similar to the FM reduction module 630 of FIG. 6 and/or 730 of FIG. 7. The polar transmitter 800 can include a phase shift calculator module 827, implemented on the FM path 816 between the output of the cartesian to polar conversion module 820 and the input of the FM reduction module 830. In one illustrative example, the phase shift calculator module 827 of FIG. 8 can be the same as or similar to one or more of the phase shift calculator module 327 of FIG. 3, 627 of FIG. 6, 727 of FIG. 7, etc. The phase shift calculator module 827 can be configured to receive the phase inputs generated by the cartesian to polar conversion module 820 (e.g., the angle of the complex data 802, etc.). The phase shift calculator module 727 can unwrap these phase inputs and then differentiate the unwrapped phase over time. By unwrapping the phase inputs of the cartesian to polar conversion module 820 and then differentiating over time, the phase shift calculator module 827 can be used to transform from a phase value from the CORDIC to phase values that correspond to frequency shifts. The FM reduction module 830 may receive as input the phase shift information and/or phase values corresponding to frequency shifts, as determined by the upstream phase shift calculator module 827 coupled to the input of the FM reduction module 830.

An input signal comprising baseband complex data 802 can be the same as or similar to the baseband complex data 602 of FIG. 6 and/or 702 of FIG. 7. An input interpolator 810 can be the same as or similar to the input interpolator 710 of FIG. 7. A cartesian to polar conversion module 820 can be the same as or similar to the cartesian to polar conversion module 620 of FIG. 6 and/or 720 of FIG. 7. An ADPLL 842 (e.g., LO) can be the same as or similar to the ADPLL 742 (e.g., LO) of FIG. 7. A frequency divider 846 can be the same as or similar to the frequency divider 746 of FIG. 7. A quadrature generator 850 can be the same as or similar to the quadrature generator 650 of FIG. 6 and/or 750 of FIG. 7. A phase select multiplexer (mux) 865 can be the same as or similar to the phase select mux 660 of FIG. 6 and/or 760 of FIG. 7. An SCPA 870 can be the same as or similar to the SCPA 670 of FIG. 6 and/or 770 of FIG. 7. The AM path 812 can be the same as or similar to the AM path 612 of FIG. 6 and/or 712 of FIG. 7. The FM path 816 can be the same as or similar to the FM path 616 of FIG. 6 and/or 716 of FIG. 7. The SCPA phase select parameter 836 can be the same as or similar to the SCPA phase select parameter 736 of FIG. 7, and/or the phase select parameter 635 of FIG. 6.

In the example of the polar transmitter 800 of FIG. 8, both sign changes and jumps between I and Q phases can be implemented at the output of the cartesian to polar conversion module 820 (prior to the SCPA 870 level), as noted above. For instance, the FM reduction module 830 can be configured to generate an AM path phase select parameter 834, which is provided as input to an AM path phase select mux 882. The AM path phase select parameter 834 and the AM path phase select mux 882 of FIG. 8 can be similar to the AM path sign select parameter 734 and AM path sign selection module 735 of FIG. 7, with the AM path phase select parameter 834 and AM path phase select mux 882 of FIG. 8 configured to implement both sign changes for the magnitudes on the AM path 812 (e.g., the same as or similar to the sign changes implemented on the magnitudes of the AM path 712 in FIG. 7), and configured to additionally/further implement jumps between I and Q phases for the magnitudes on the AM path 812.

For example, the AM path phase select mux 882 can receive as input the magnitudes on the AM path 812 output from the cartesian to polar conversion module 820, and the AM path phase select parameter 834 generated as output by the FM reduction module 830. Based on the information encoded within the AM path phase select parameter 834, the AM path phase select mux 882 can generate as output an AM path ±I signal 886 and an AM path ±Q signal 888, which are provided to respective interpolators 887 and 889 included in the sign and phase jumping module 880 of the polar transmitter 800 architecture of FIG. 8.

For example, the AM path ±I signal 886 can be provided to the corresponding interpolator 887 and used to generate a Q-input signal that is provided from the sign and phase jumping module 880 to the SCPA phase select mux 865. Likewise, the AM path ±Q signal 888 can be provided to the corresponding interpolator 889 and used to generate an I-input signal that is provided from the sign and phase jumping module 880 to the SCPA phase select mux 865. The SCPA phase select mux 865 receives the I-input and Q-input from the sign and phase jumping module 880, with the selection between I and Q phases and the selection between + and − sign already implemented (e.g., at the output of the cartesian to polar conversion module 820, before the SCPA 870 level). The SCPA phase select mux 865 additionally receives as input the SCPA phase select parameter 836 from the FM reduction module 830. Based on these three inputs, the SCPA phase select mux 865 generates the modified I-input' signal and the modified Q-input' signal as the respective outputs from the SCPA phase select mux 865 to the SCPA 870. The SCPA 870 receives the additional inputs comprising the I+ clock signal and the Q+ clock signal, which can be the same as or similar to the I+ and Q+ clock signals, respectively, described above with respect to FIG. 7 as inputs to the SCPA 770 of FIG. 7.

Figure 9:
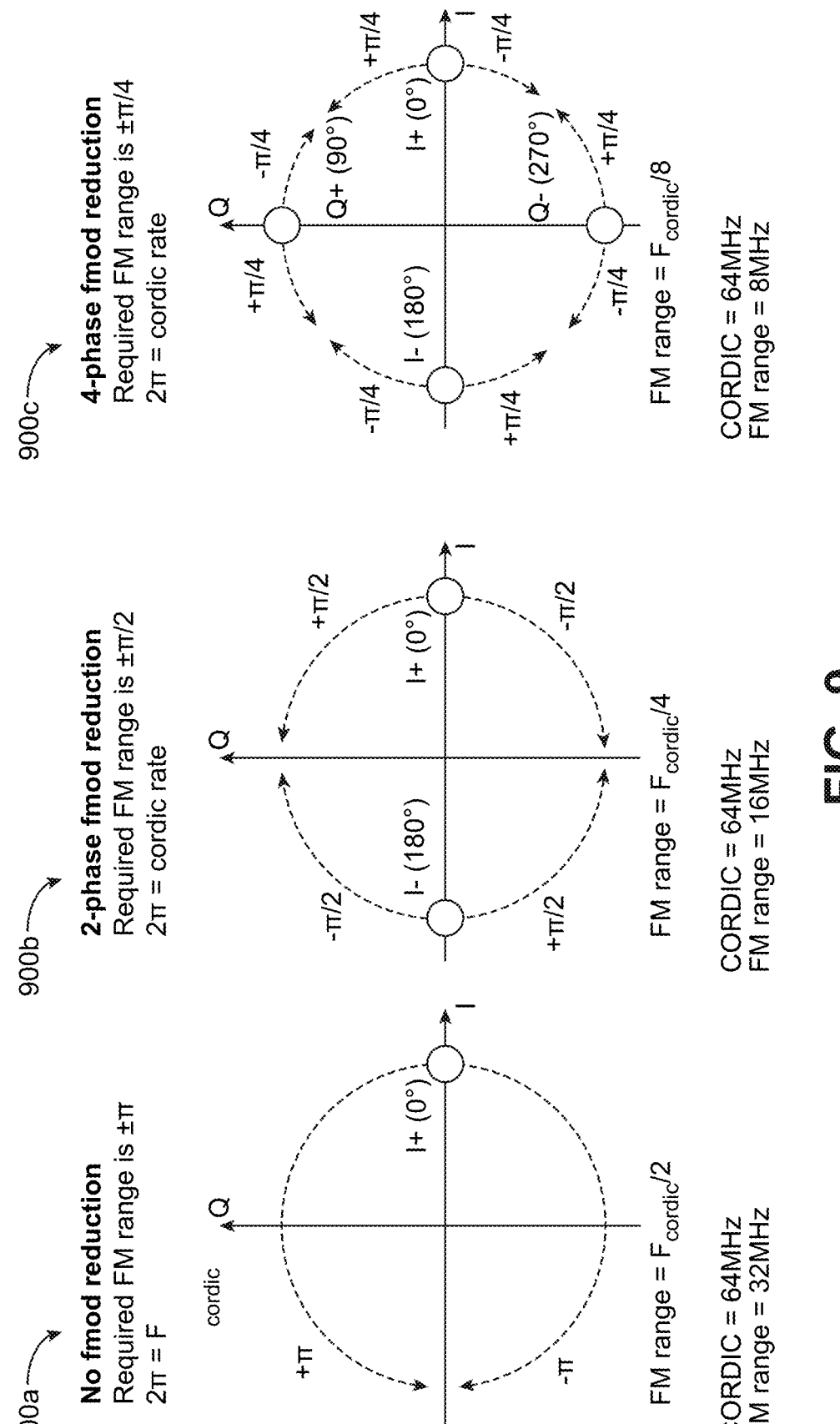
FIG. 9 is a diagram illustrating examples of FM range reduction for polar transmitters, including an example of no FM range reduction for a polar transmitter, an example of 2-phase FM range reduction for a polar transmitter, and an example of 4-phase FM range reduction for a polar transmitter, in accordance with some examples.

FIG. 9 is a diagram illustrating examples of FM range reduction for polar transmitters, such as the polar transmitter 600 of FIG. 6, the polar transmitter 700 of FIG. 7, the polar transmitter 800 of FIG. 8, etc. As illustrated, FIG. 9 depicts an example 900a of no FM range reduction for a polar transmitter (e.g., a conventional polar transmitter), an example 900b of 2-phase FM range reduction for a polar transmitter (e.g., polar transmitter 600, 700, 800, etc., described herein), and an example 900c of 4-phase FM range reduction for a polar transmitter (e.g., polar transmitter 600, 700, 800, etc., described herein), in accordance with some examples. In some aspects, FIG. 9 shows the concept of the FM range reduction method implemented in the polar transmitters according to various embodiments of the present invention.

In some aspects, the cartesian to polar conversion module (e.g., such as the cartesian to polar conversion module 620 of FIG. 6, 720 of FIG. 7, 820 of FIG. 8, etc.) can be implemented using a Coordinate Rotation Digital Computer (CORDIC). For example, the cartesian to polar conversion module can be implemented as a CORDIC is running at 64 MHz for polar transmitters transmitting IEEE 802.11ah signals on a 4 MHz bandwidth with an OSR of 16. The maximum phase change in a conventional polar transmitter without implementing the FM reduction method is $+\pi$ (+180°) or $-\pi$ (−180°), as shown in the 'no fmod reduction' coordinate plane of the first example 900a in FIG. 9. The CORDIC rate of 64 MHz is $2\pi$ in this example, the FM range of $+/-\pi$ for the conventional polar transmitter is equivalent to +/−32 MHz.

In an embodiment of the polar transmitter with FM reduction (e.g., polar transmitter 600, 700, 800, etc., described herein), two phase selections may be available, for example, positive in-phase (I+) and negative in-phase (I−). The phase of the clock input fed into the SCPA (e.g., SCPA 670, 770, 870, etc.) can be dynamically switched from I+ to I−, or can be dynamically switches from I− to I+, without frequency modulating this 180° phase change. The maximum phase change in this embodiment is $+\pi/2$ (+90°) or $-\pi/2$ (−90°), as shown in the '2-phase fmod reduction' coordinate plane of the second example 900b in FIG. 9. The FM range for the polar transmitter with two phase selections can therefore be reduced to $\pm\pi/2$, which is equivalent to ±16 MHz.

In another embodiment, the polar transmitter with FM reduction (e.g., polar transmitter 600, 700, 800, etc., described herein) has four phase selections, for example, positive in-phase (I+), negative in-phase (I−), positive quadrature-phase (Q+), and negative quadrature-phase (Q−). The phase of the clock input fed into the SCPA (e.g., SCPA 670, 770, 870, etc.) can be dynamically switched allowing +180°, +90°, and −90° phase shifts without frequency modulating these phase shifts. The maximum phase change in this embodiment is $+\pi/4$ (+45°) or $-\pi/4$ (−45°), as shown in the '4-phase fmod reduction' coordinate plane of the third example 900c in FIG. 9. An absolute value of the phase change greater than $\pi/4$ will be converted to a modified phase and a corresponding phase selection. The FM range for the polar transmitter with four phase selections can further reduced to $\pm\pi/4$, which is equivalent to ±8 MHz. By implementing this FM reduction method with four phase selection, the required FM range is reduced from ±32 MHz to ±8 MHz for the 4 MHz 802.11ah case.

Figure 10:
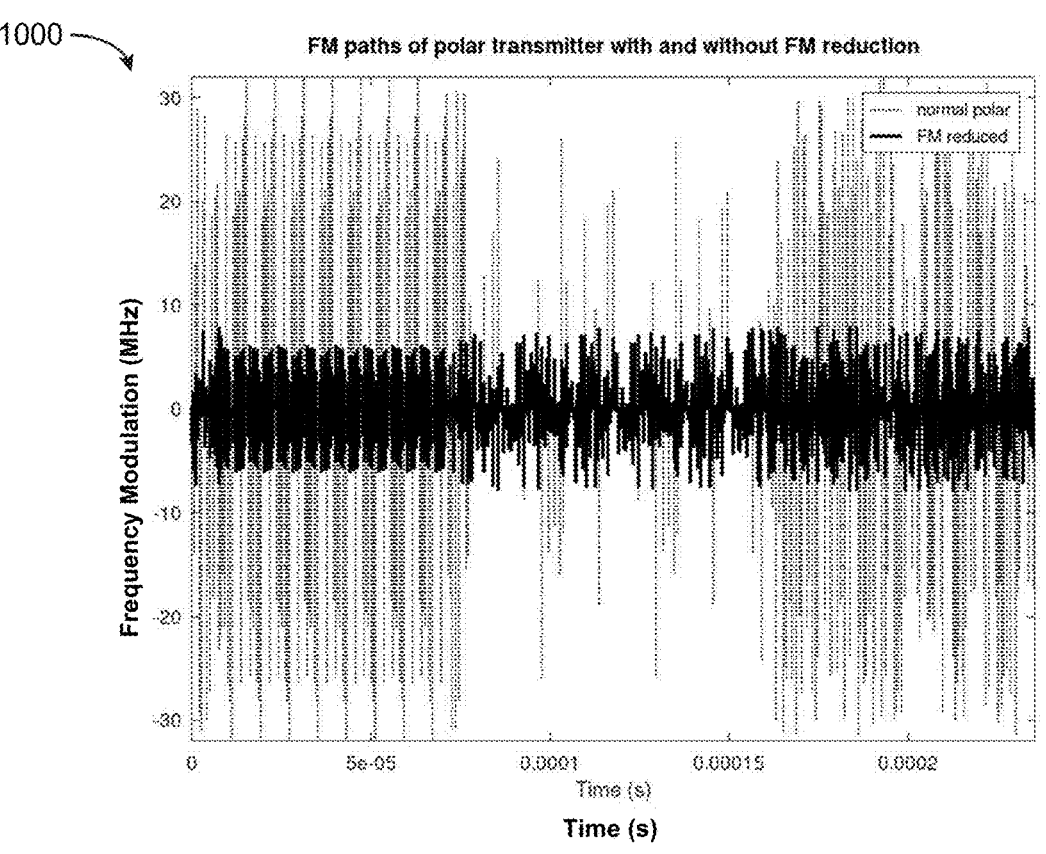
FIG. 10 is a graph illustrating an example of experimental results corresponding to FM paths of a polar transmitter, with and without FM reduction, for transmitting an IEEE 802.11ah signal on a 4 MHz bandwidth, in accordance with some examples.
Figure 11:
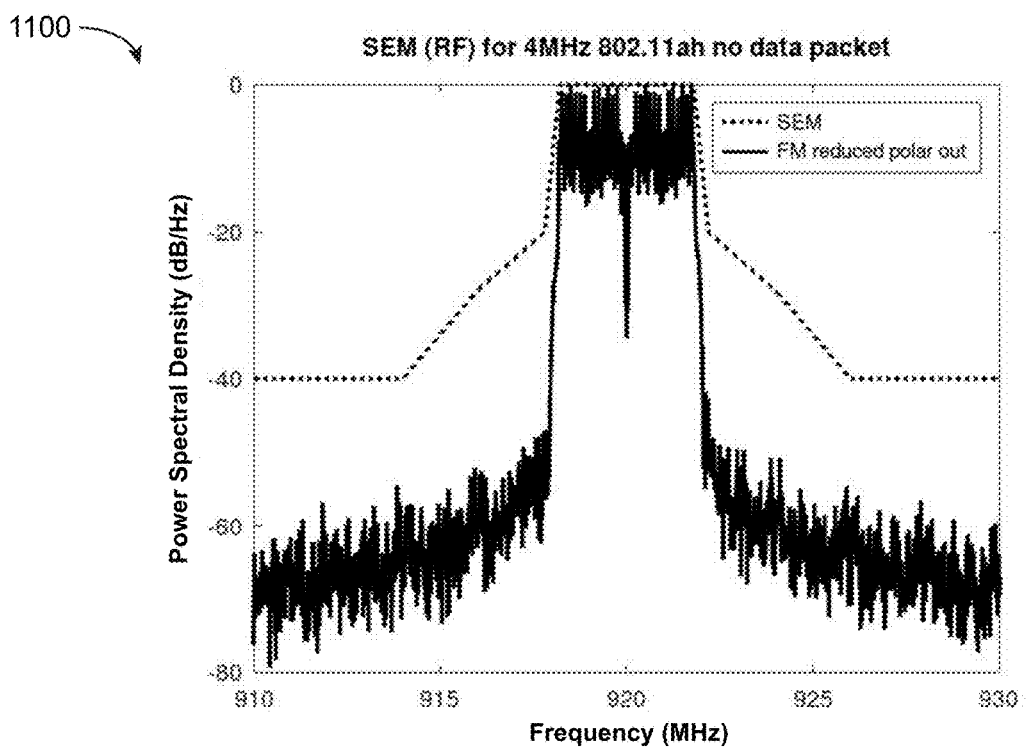
FIG. 11 is a graph illustrating an example of measurement results of Power Spectral Density (PSD) and associated with Spectral Emission Mask (SEM) requirements for transmitting no data packets on a 4 MHz IEEE 802.11ah signal, in accordance with some examples.

FIG. 10 is a graph 1000 illustrating an example of experimental results showing FM paths of a polar transmitter with and without FM reduction for transmitting an IEEE 802.11ah signal on a 4 MHz bandwidth. The FM path of the conventional polar transmitter without FM reduction goes up to 32 MHz and down to −32 MHz, whereas the FM path of an embodiment of the polar transmitter with FM reduction only oscillates between 8 MHz and −8 MHz. From simulation results of implementing the FM reduction method of the present invention, a FM range of only ±8 MHz is possible in both the 860 MHz and 920 MHz frequency bands. FIG. 11 is a graph illustrating an example of measurement results of Power Spectral Density (PSD) and associated with Spectral Emission Mask (SEM) requirements for transmitting no data packets on a 4 MHz IEEE 802.11ah signal, in accordance with some examples. In particular, FIG. 11 shows measurement results of PSD for transmitting a no data packet (NDP) on a 4 MHz IEEE 802.11ah signal using a polar transmitter with FM reduction according to an embodiment of the present invention. The PSD of the RF output is below the SEM requirement which satisfies the SEM requirement.

For a conventional polar transmitter used in an IEEE 802.11n communication system, an OSR of 12 is required for a 2.4 GHz signal to transmit on a 20 MHz bandwidth. The cartesian to polar conversion module of this conventional polar transmitter is running at 240 MHz, resulting in a FM range of ±120 MHz. Embodiments of the polar transmitter implementing a FM reduction method also reduce the required FM range to a feasible range. For example, an IEEE 802.11n polar transmitter selecting a phase from four possible phase selections and feeding a clock signal with the selected phase into the PA can reduce the FM range from ±120 MHz to ±30 MHz. An IEEE 802.11n polar transmitter selecting a phase from eight possible phase selections and feeding a clock signal with the selected phase into the PA can reduce the FM range further to ±15 MHz.

FIG. 16 is a flow diagram of an example of a process 1600 for performing polar transmission using a polar transmitter with a reduced frequency modulation (FM) range requirement. For example, the process 1600 can be performed using one or more of the polar transmitter 600 of FIG. 6, the polar transmitter 700 of FIG. 7, the polar transmitter 800 of FIG. 8, etc. In some examples, the process 1600 can be performed using a polar transmitter that includes an FM reduction module, the same as or similar to one or more of the FM reduction module 630 of FIG. 6, the FM reduction module 730 of FIG. 7, the FM reduction module 830 of FIG. 8, etc. In some aspects, at block 1602, the process 1600 can include converting baseband complex data into a magnitude component and a phase component. At block 1604, the process 1600 can include determining a phase selection for each respective phase of the phase component based on selecting from a plurality of configured phase selections, and generating a phase select parameter and a modified phase for each respective phase based on the phase selection determined for the respective phase. At block 1606, the process 1600 can include generating a set of clock signals, the set of clock signals including: a clock signal generated with a frequency corresponding to the modified phase, and one or more shifted clock signals generated with a shift in phase relative to the clock signal. At block 1608, the process 1600 can include selecting an input clock signal from the set of clock signals, wherein the input clock signal is selected based on the phase select parameter. At block 1610, the process 1600 can include driving a Power Amplifier (PA), using a representation of the magnitude component and further using the input clock signal, to generate a radio frequency (RF) signal. At block 1612, the process 1600 can include transmitting the RF signal on a wireless medium.

Figure 17:
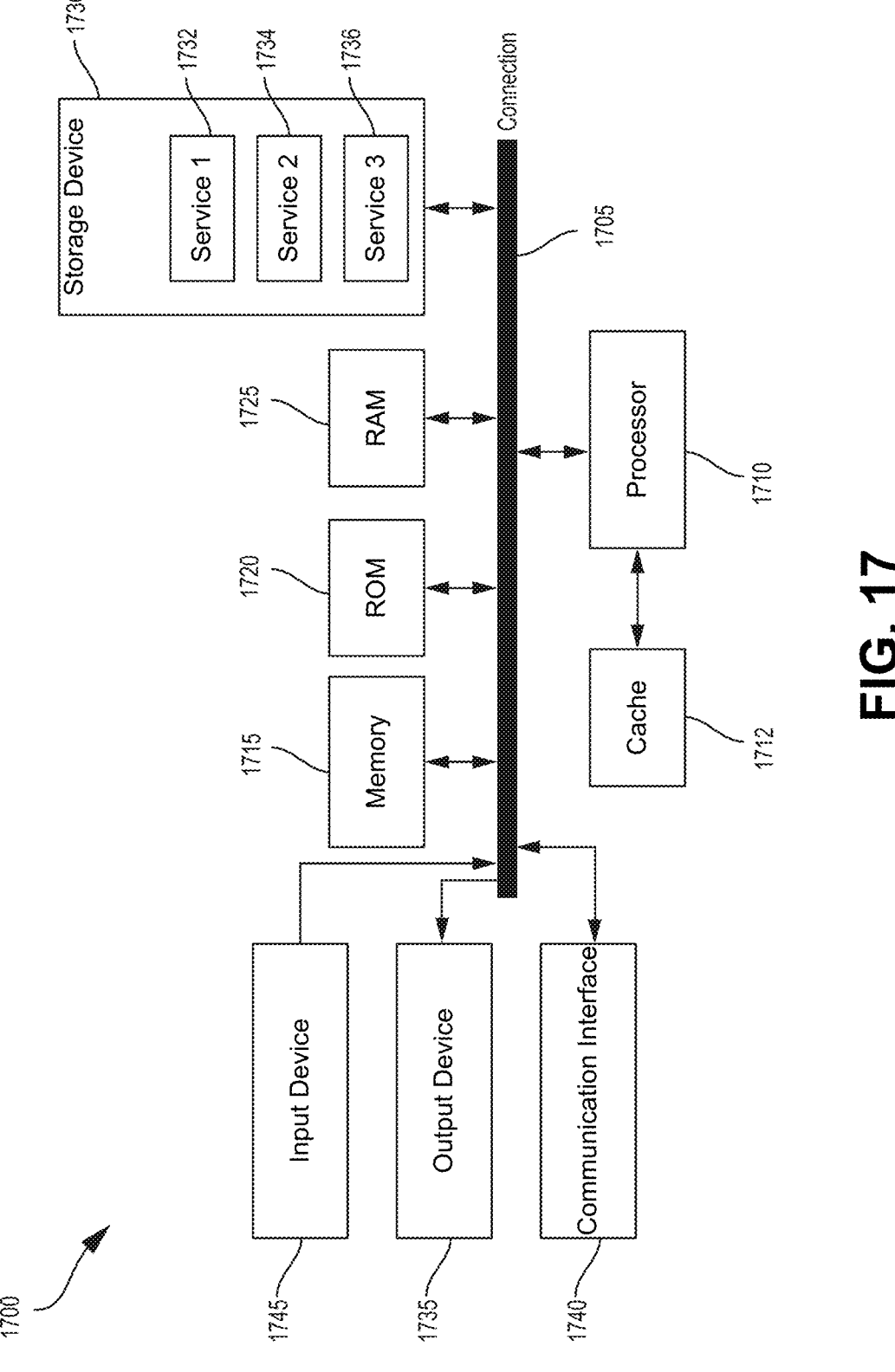
FIG. 17 is a block diagram illustrating an example of a computing system for implementing certain aspects described herein, in accordance with some examples.

FIG. 17 illustrates a computing device architecture 1700 of a computing device which can implement one or more techniques described herein. In some examples, the computing device can include a mobile device, a wearable device, an extended reality device (e.g., a Virtual Reality (VR) device, an Augmented Reality (AR) device, or a Mixed Reality (MR) device), a personal computer, a laptop computer, a video server, a vehicle (or computing device of a vehicle), or other device. The components of computing device architecture 1700 are shown in electrical communication with each other using connection 1705, such as a bus. The computing device architecture 1700 includes a processing unit 1710 and computing device connection 1705 that couples various computing device components including computing device memory 1715, such as Read Only Memory (ROM) 1720 and Random-Access Memory (RAM) 1725, to processor 1710.

Computing device architecture 1700 can include a cache of high-speed memory connected directly with, in close proximity to, or integrated as part of processor 1710. Computing device architecture 1700 can copy data from memory 1715 and/or the storage device 1730 to cache 1712 for quick access by processor 1710. In this way, the cache can provide a performance boost that avoids processor 1710 delays while waiting for data. These and other engines can control or be configured to control processor 1710 to perform various actions. Other computing device memory 1715 may be available for use as well. Memory 1715 can include multiple different types of memory with different performance characteristics. Processor 1710 can include any general-purpose processor and a hardware or software service, such as service 1 1732, service 2 1734, and service 3 1736 stored in storage device 1730, configured to control processor 1710 as well as a special-purpose processor where software instructions are incorporated into the processor design. Processor 1710 may be a self-contained system, containing multiple cores or processors, a bus, memory controller, cache, etc. A multi-core processor may be symmetric or asymmetric.

To enable user interaction with the computing device architecture 1700, input device 1745 can represent any number of input mechanisms, such as a microphone for speech, a touch-sensitive screen for gesture or graphical input, keyboard, mouse, motion input, speech and so forth. Output device 1735 can also be one or more of a number of output mechanisms known to those of skill in the art, such as a display, projector, television, speaker device, etc. In some instances, multimodal computing devices can enable a user to provide multiple types of input to communicate with computing device architecture 1700. Communication interface 1740 can generally govern and manage the user input and computing device output. There is no restriction on operating on any particular hardware arrangement and therefore the basic features here may easily be substituted for improved hardware or firmware arrangements as they are developed.

Storage device 1730 is a non-volatile memory and can be a hard disk or other types of computer readable media which can store data that are accessible by a computer, such as magnetic cassettes, flash memory cards, solid state memory devices, digital versatile disks, cartridges, RAM, ROM, and hybrids thereof. Storage device 1730 can include services 1732, 1734, 1736 for controlling processor 1710. Other hardware or software modules or engines are contemplated. Storage device 1730 can be connected to the computing device connection 1705. In one aspect, a hardware module that performs a particular function can include the software or processor readable codes stored in a computer-readable medium in connection with the necessary hardware components, such as processor 1710, connection 1705, output device 1735, and so forth, to carry out the function.

The term "device" is not limited to one or a specific number of physical objects (such as one smartphone, one controller, one processing system and so on). As used herein, a device may be any electronic device with one or more parts that may implement at least some portions of this disclosure.

Individual aspects may be described above as a process or method which is depicted as a flowchart or a data flow diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, or a subprogram. When a process corresponds to a function, its termination can correspond to a return of the function to the calling function or the main function.

The techniques described herein may also be implemented in electronic hardware, computer software, firmware, or any combination thereof. Such techniques may be implemented in any of a variety of devices such as general purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above.

The program code may be executed by a processor, which may include one or more processors, such as one or more Digital Signal Processors (DSPs), general purpose microprocessors, an Application Specific Integrated Circuits (ASICs), Field Programmable Gate Arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices.

What is claimed is:

1. A polar transmitter transmitting a Radio Frequency (RF) signal in a wireless communication network, the polar transmitter comprising:

a cartesian to polar conversion module configured to generate a magnitude component and a phase component from baseband complex data received as an input;

a frequency modulation (FM) reduction module configured to determine a phase selection for each respective phase of the phase component based on selecting from a plurality of configured phase selections, wherein the FM reduction module is further configured to generate a phase select parameter and a modified phase for each respective phase based on the phase selection;

a local oscillator (LO) configured to receive the modified phase from the FM reduction module and generate a clock signal with a frequency corresponding to the modified phase;

a quadrature generator configured to receive the clock signal from the LO and generate a set of clock signals, the set of clock signals including the clock signal and one or more shifted clock signals with a shift in phase relative to the clock signal received from the LO;

a phase select multiplexer, configured to select an input clock signal from the set of clock signals, wherein the input clock signal is selected based on the phase select parameter; and a Power Amplifier (PA), coupled to the phase select multiplexer and configured to generate the RF signal from a representation of the magnitude component as processed on an amplitude modulation (AM) path of the polar transmitter, and utilizing the input clock signal from the phase select multiplexer.

2. The polar transmitter of claim 1, wherein the plurality of configured phase selections includes four phase selections, the four phase selections comprising: a positive in-phase (I+) phase selection, a negative in-phase (I−) phase selection, a positive quadrature-phase (Q+) phase selection, and a negative quadrature-phase (Q−) phase selection.

3. The polar transmitter of claim 2, wherein the FM reduction module generates the phase select parameter and a sign select parameter for each respective phase, the phase select parameter and the sign select parameter corresponding to the phase selection determined for each respective phase, and wherein the sign select parameter is outputted to the PA.

4. The polar transmitter of claim 3, wherein:

the quadrature generator is configured to generate one shifted clock signal with a 90 degree shift in phase relative to a phase of the clock signal received from the LO;

the phase select multiplexer selects the input clock signal from a set of two clock signals comprising the one shifted clock signal and the clock signal received from the LO, the selection performed according to the phase select parameter; and the PA adaptively inverts the input clock signal based on a value of the sign select parameter.

5. The polar transmitter of claim 2, wherein:

the phase select parameter solely indicates the phase selection;

the quadrature generator is configured to generate three shifted clock signals based on the clock signal received from the LO, wherein the three shifted clock signals are generated with 90 degree phase shifts from each other; and the phase select multiplexer selects the input clock signal from a set of four clock signals comprising the three shifted clock signals and the clock signal received from the LO, the selection performed according to the phase select parameter.

6. The polar transmitter of claim 1, wherein the FM reduction module is further configured to determine a phase difference between consecutive phases of the phase component from the baseband complex data received as the input, and wherein the phase selection for each respective phase is determined based on the corresponding phase difference.

7. The polar transmitter of claim 6, wherein the phase selection is unchanged in response to a determination the corresponding phase difference between consecutive phases is less than a configured threshold.

8. The polar transmitter of claim 1, wherein the PA is a Switched Capacitor Power Amplifier (SCPA).

9. The polar transmitter of claim 1, wherein the cartesian to polar conversion module comprises a Coordinate Rotation Digital Computer (CORDIC).

10. The polar transmitter of claim 1, wherein the RF signal transmitted in the wireless communication network is modulated utilizing Orthogonal Frequency Division Multiplexing (OFDM).

11. The polar transmitter of claim 1, wherein the FM reduction module is further configured to:

determine a correction term for an in-phase/quadrature-phase (I/Q) phase imbalance associated with the modified phase; and apply the determined correction term to the modified phase to correct the I/Q phase imbalance.

12. A transmission method for a polar transmitter operating in a wireless communication network, the transmission method comprising:

converting baseband complex data into a magnitude component and a phase component;

determining a phase selection for each respective phase of the phase component based on selecting from a plurality of configured phase selections;

generating a phase select parameter and a modified phase for each respective phase based on the phase selection determined for each respective phase;

generating a clock signal with a frequency corresponding to the modified phase;

generating a set of clock signals, the set of clock signals including the clock signal and one or more shifted clock signals with a shift in phase relative to the clock signal;

selecting an input clock signal from the set of clock signals, wherein the input clock signal is selected based on the phase select parameter;

driving a Power Amplifier (PA), utilizing a representation of the magnitude component and utilizing the input clock signal, to generate a radio frequency (RF) signal; and transmitting the RF signal on a wireless medium.

13. The transmission method of claim 12, wherein the plurality of configured phase selections includes four phase selections, the four possible phase selections comprising: a positive in-phase (I+) phase selection, a negative in-phase (I−) phase selection, a positive quadrature-phase (Q+) phase selection, and a negative quadrature-phase (Q−) phase selection.

14. The transmission method of claim 13, wherein a frequency modulation (FM) range of the polar transmitter is reduced based on jumping between the four phase selections to generate the RF signal.

15. A polar transmitter transmitting a Radio Frequency (RF) signal in a wireless communication network, the polar transmitter comprising:

a cartesian to polar conversion module configured to generate a magnitude component and a phase component from baseband complex data received as an input;

a frequency modulation (FM) reduction module configured to determine a phase selection for each respective phase of the phase component based on selecting from a plurality of configured phase selections, and further configured to generate a phase select parameter, a modified phase, and a sign parameter for each respective phase based on the phase selection for the respective phase;

a Phase Lock Loop (PLL) configured to receive the modified phase and generate a clock signal with a frequency based on the modified phase;

a quadrature generator configured to receive the clock signal from the PLL and generate a shifted clock signal based on applying a phase shift to the clock signal;

an Amplitude Modulation (AM) module configured to generate a signed magnitude component based on the magnitude component from the cartesian to polar conversion module and the sign parameter from the FM reduction module, the sign parameter indicative of a positive or negative sign for the magnitude component;

a phase select multiplexer configured to receive the phase select parameter from the FM reduction module and the signed magnitude component from the AM module, wherein the phase select multiplexer generates an in-phase (I) input and a quadrature (Q) input based on the phase select parameter and the signed magnitude component; and a Power Amplifier (PA), coupled to the phase select multiplexer and the quadrature generator, wherein the PA is driven to generate the RF signal utilizing one or more of the I input or Q input according to one or more of the clock signal or the shifted clock signal received from the quadrature generator.

16. The polar transmitter of claim 15, wherein the PA is a Switched Capacitor Power Amplifier (SCPA).

17. The polar transmitter of claim 15, further comprising a frequency divider configured to divide a frequency of the clock signal from the PLL to generate a divided clock signal before output to the quadrature generator, wherein the PA is driven according to one or more of the divided clock signal or a shifted divided clock signal.

18. The polar transmitter of claim 17, wherein the shifted divided clock signal is generated by the quadrature generator, based on applying the phase shift to the divided clock signal.

19. The polar transmitter of claim 15, wherein the FM reduction module is further configured to:

determine a correction term for an in-phase/quadrature-phase (I/Q) phase imbalance associated with the modified phase; and apply the determined correction term to the modified phase to correct the I/Q phase imbalance.

20. The polar transmitter of claim 15, wherein the PLL is configured to correct for linear drift in a Local Oscillator (LO) gain according to a correction term of a LO gain gradient.

* * * * *